United States Patent [19]

Hattori et al.

[11] 4,300,490
[45] Nov. 17, 1981

[54] AIR-FUEL MIXTURE RATIO CORRECTING SYSTEM FOR CARBURETOR

[75] Inventors: Tadashi Hattori, Nishio; Shigetaka Takada, Oobu; Kenji Hayashi, Aichi; Toshiharu Iwata, Okazaki, all of Japan

[73] Assignee: Nippon Soken, Inc., Nishio, Japan

[21] Appl. No.: 22,999

[22] Filed: Mar. 22, 1979

Related U.S. Application Data

[62] Division of Ser. No. 758,338, Jan. 10, 1977, Pat. No. 4,153,021, which is a division of Ser. No. 475,917, Jun. 3, 1974, Pat. No. 4,036,186.

[30] Foreign Application Priority Data

| Jun. 4, 1973 | [JP] | Japan | 48/63243 |
| Jun. 4, 1973 | [JP] | Japan | 48/63244 |
| Jun. 4, 1973 | [JP] | Japan | 48/63245 |
| Jul. 26, 1973 | [JP] | Japan | 48/84346 |
| Sep. 27, 1973 | [JP] | Japan | 48/109060 |

[51] Int. Cl.³ .................................................. F02M 9/06
[52] U.S. Cl. .................................... 123/439; 261/44 C
[58] Field of Search .......... 123/32EE, 32 EA, 119 R, 123/119 EC, 119 VC; 261/44 C, DIG. 74

[56] References Cited

U.S. PATENT DOCUMENTS

| 3,855,974 | 12/1974 | Mayer | 123/32 EE |
| 3,899,552 | 8/1975 | Bauer | 123/119 EC |
| 4,060,064 | 11/1977 | Minami | 123/119 EC |

Primary Examiner—Ronald H. Lazarus
Attorney, Agent, or Firm—Cushman, Darby & Cushman

[57] ABSTRACT

There is provided an air-fuel mixture ratio correcting system for a carburetor in which the air-fuel ratio of a mixture fed to an engine is detected whereby to control the amount of auxiliary fuel and/or the amount of auxiliary air to always control the air-fuel ratio of the mixtures at the correct value.

5 Claims, 42 Drawing Figures

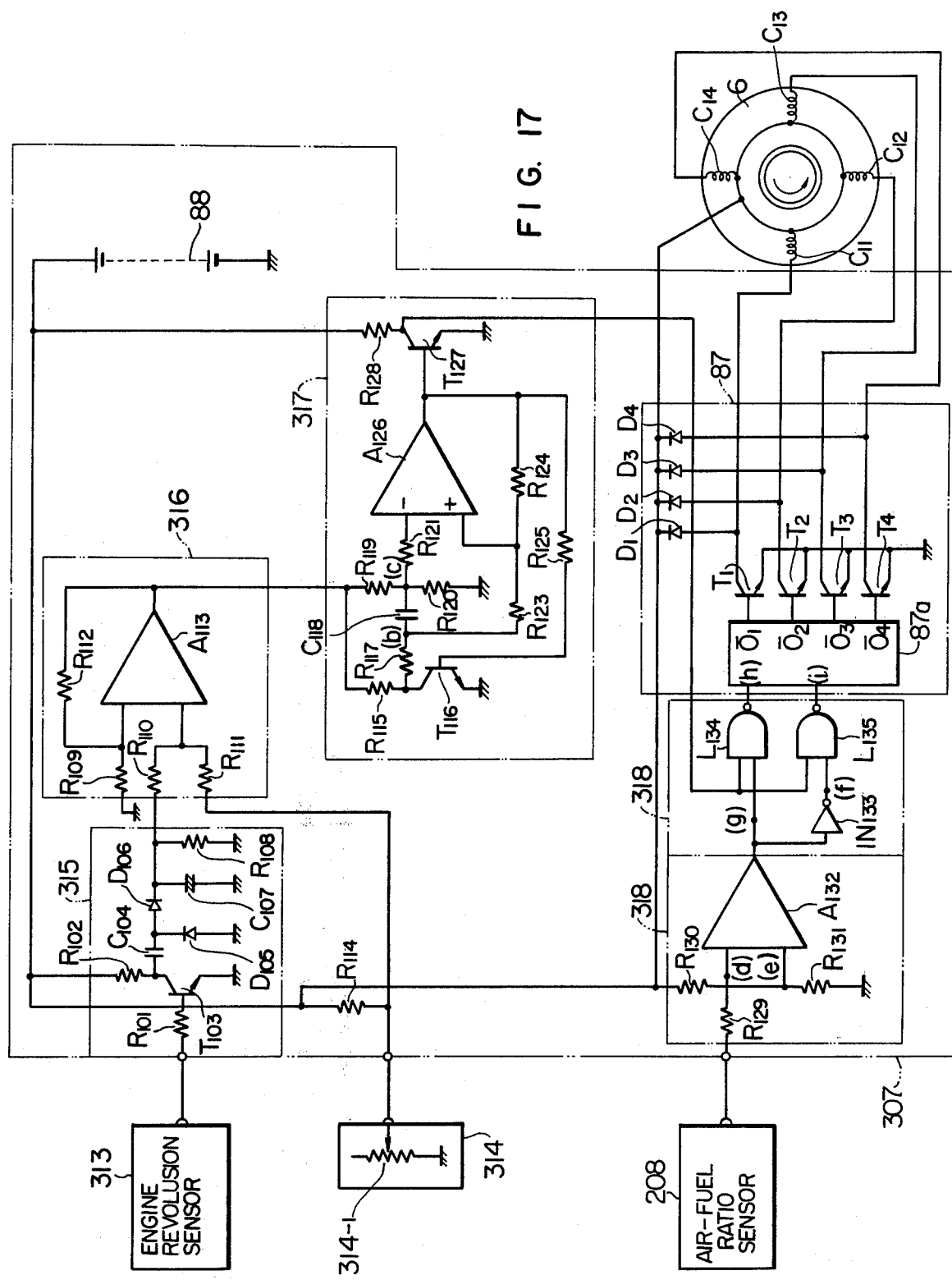
F I G. 17

F I G. 23(a)
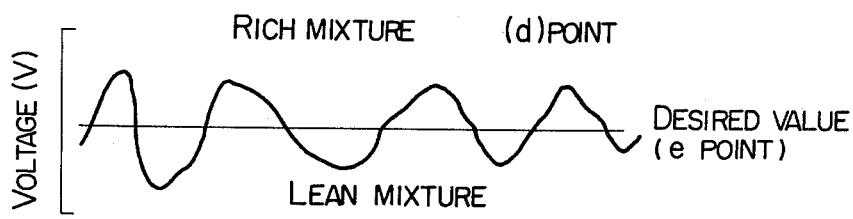
F I G. 23(b)
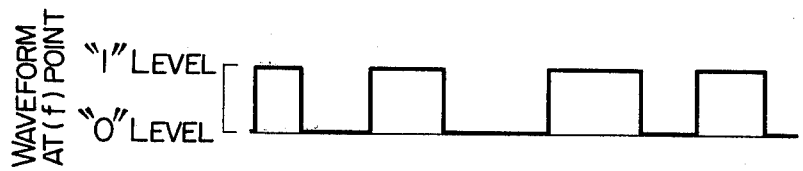
F I G. 23(c)
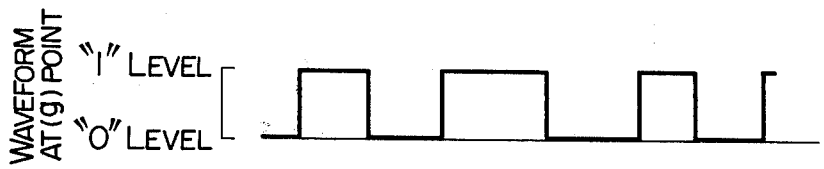
F I G. 23(d)
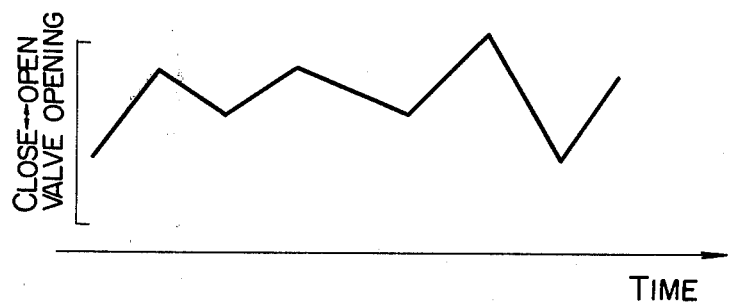

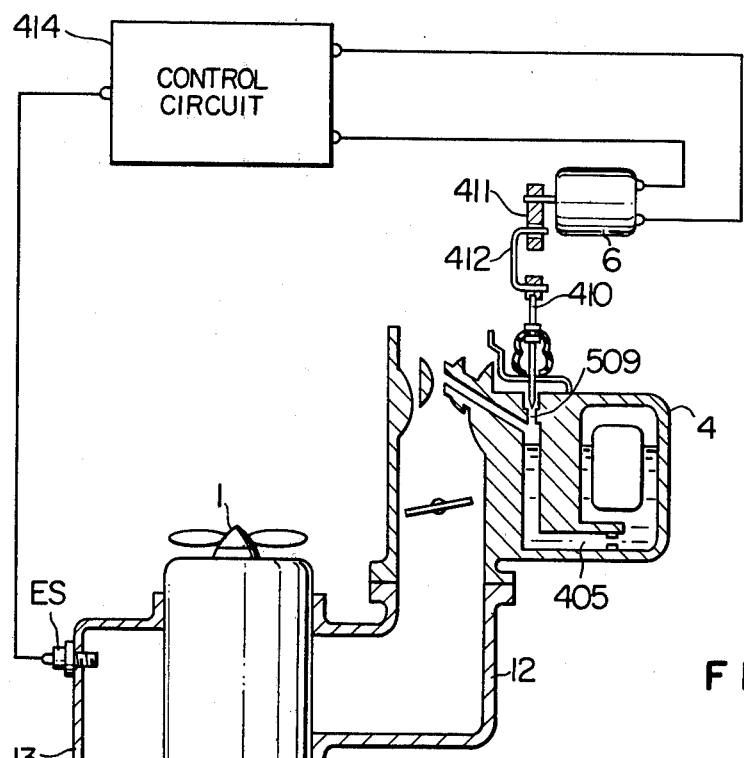
FIG. 27
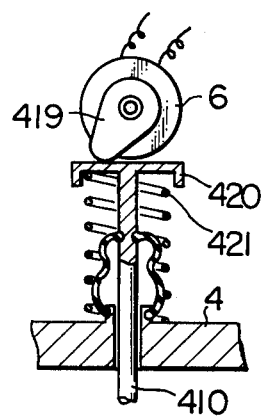
FIG. 26(a)
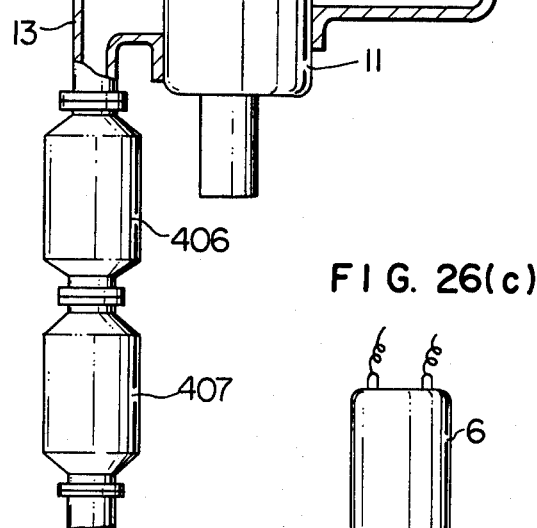
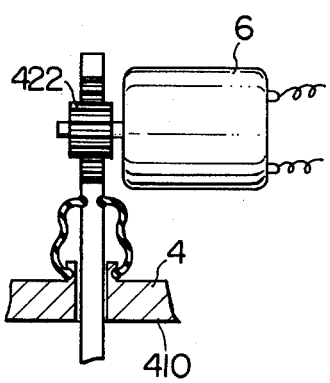
FIG. 26(b)
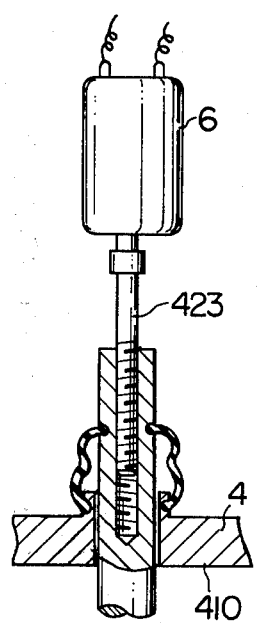
FIG. 26(c)

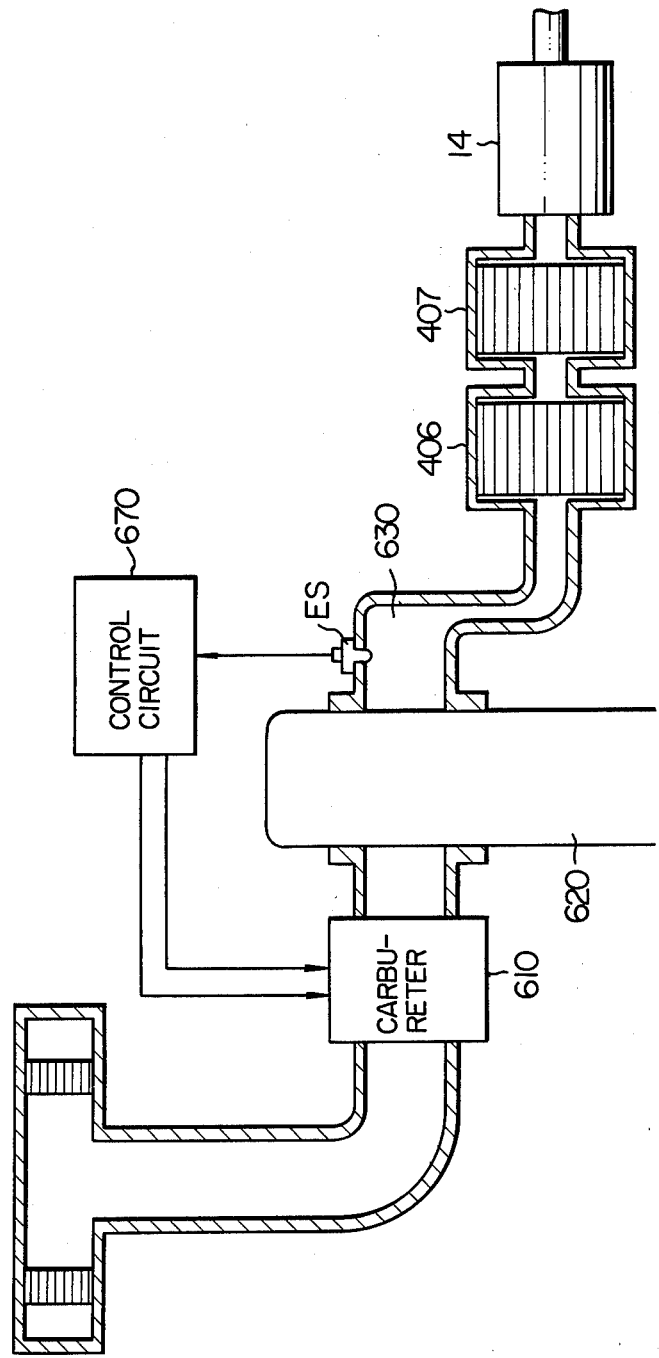

AIR-FUEL MIXTURE RATIO CORRECTING SYSTEM FOR CARBURETOR

This application is a divisional application of Ser. No. 758,338, file Jan. 10, 1977 and now U.S. Pat. No. 4,153,021, which was a divisional application of Ser. No. 475,917 filed June 3, 1974 which is now U.S. Pat. No. 4,036,186.

BACKGROUND OF THE INVENTION

1. Field of the Invention

In order to ensure the maximum efficiency of an improved engine devised as an automobile exhaust emission control effort or when it is desired to obtain the optimum cleaning of exhaust gases by a catalyst in an engine equipped with an exhaust gas cleaning catalyst for exhaust emission control purposes, the air-fuel ratio of the mixtures supplied to the engine through the carburetor must always be controlled at the correct value. The present invention relates to an air-fuel mixture ratio correcting system for an automobile internal combustion engine carburetor which meets these requirements.

2. Description of the Prior Art

It is known in the art that the air-fuel ratio of the mixtures supplied into the cylinders of an engine has a great effect on the quality of ignition and combustion of the mixtures as well as on the exhaust gas composition, and various efforts have heretofore been made toward accurate controlling of the air-fuel ratio of the mixtures fed to an engine. These efforts range from the improved accuracy of finishing for the carburetor component parts and increased carburetor adjustments to efforts toward more accurate methods of measuring the amount of air drawn into an engine and correspondingly accurate fuel metering methods in the case of fuel injection type fuel feed systems.

However, these methods are primarily concerned with the improvements of accuracy of measuring or metering the quantity of air and fuel supplied to an engine and therefore these methods can hardly be said to have covered all the possible situations in consideration of changes in the atmospheric conditions, i.e., changes in the atmospheric pressure temperature, and humidity.

Similarly, as regards the supply of fuel, it can be hardly said that the computation of changes in the theoretical air-fuel ratio due to changes in the specific weight of the fuel, the amount of air contained in the fuel and the composition of the fuel has been made to a satisfactory extent. If a system were constructed which would meet all of these requirements technically, such a system would become exceeding high in manufacturing costs and very complicated in construction and therefore such a system would inevitably be unsuitable for use as a fuel system for internal combustion engines of the type which are now in wide use.

SUMMARY OF THE INVENTION

It is a principal object of this invention to provide a novel system which overcomes the foregoing deficiency of the prior art and which takes into consideration all of the above-mentioned variable factors to control the air-fuel ratio of the mixtures fed to an engine at the correct value.

It is another object of the present invention to provide an air-fuel mixture ratio correcting system which is capable of controlling the air-fuel mixture ratio at the correct value with a greater accuracy for rapid variations in the engine speed.

It is still another object of the present invention to provide an air-fuel mixture ratio correcting system comprising an air-fuel ratio sensor for detecting the air-fuel ratio of the mixtures fed to an engine, air-fuel ratio correcting means for controlling the amount of auxiliary fuel and/or the amount of auxiliary air, a pulse motor for actuating the air-fuel ratio correcting means, and electronic control means for determining the richness of the air-fuel mixture ratio in accordance with the output signal of the air-fuel ratio sensor and operating the pulse motor.

It is still another object of the present invention to provide an air-fuel mixture ratio correcting system of the above type wherein the pulse motor is operated at a speed corresponding to the engine operating conditions whereby to improve the air-fuel ratio correction response characteristic and correction efficiency of the air-fuel ratio correcting means.

Above and other objects, features and advantages of the present invention will become readily apparent from considering the following detailed description in conjunction with the accompanying drawings.

BRIEF DESCRIPTION OF THE DRAWINGS

FIG. 17 is a specific circuit diagram of the control circuit shown in block form in FIG. 16.

FIGS. 23(a), 23(b), 23(c) and 23(d) show waveform diagrams useful for explaining the operation of the control circuit in the embodiment of FIG. 15.

FIGS. 26(a), 26(b) and 26(c) are sectional views showing modifications of the pulse motor driving unit of FIG. 25.

FIG. 27 is a schematic diagram showing the construction of a sixth embodiment of the invention.

FIG. 28 is a schematic diagram showing the construction of a seventh embodiment of the invention.

DESCRIPTION OF THE PREFERRED EMBODIMENTS

The present invention will now be described in greater detail with reference to the illustrated embodiments. The first through fourth embodiments are designed to control the amount of correcting air at speeds corresponding to varying engine operating conditions, the fifth and sixth embodiments are designed to control the correcting fuel amount, and the seventh embodiment is designed to control the air-fuel mixture ratio for a variable venturi type carburetor.

FIRST EMBODIMENT

Figure 1:
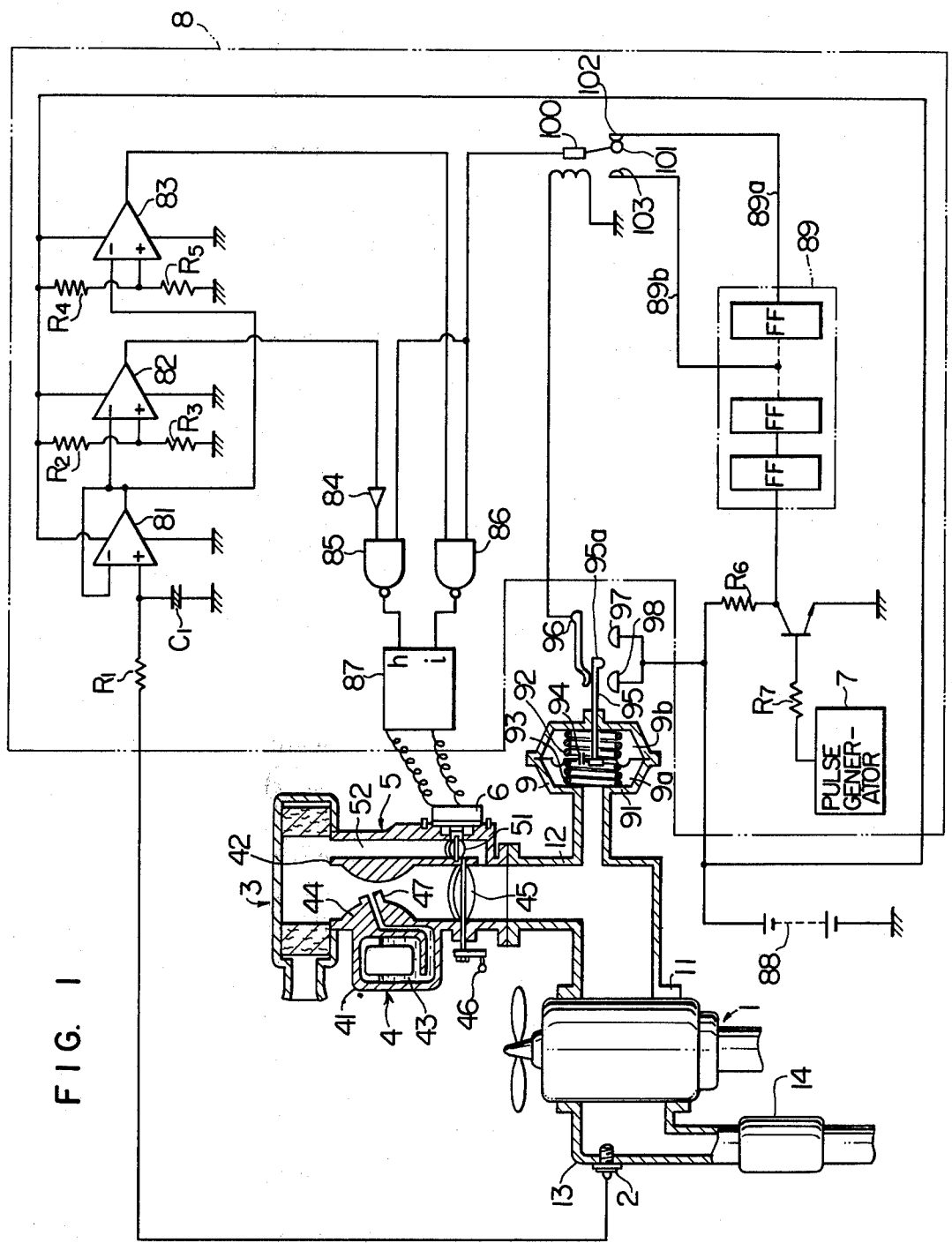
FIG. 1 is a schematic diagram showing a first embodiment of an air-fuel mixture ratio correcting system according to the present invention.

Referring first to FIG. 1, the construction and operation of the first embodiment will be described. In FIG. 1, numeral 1 designates an internal combustion engine having a cylinder assembly 11, an intake manifold 12 and an exhaust manifold 13. Numeral 14 designates an exhaust muffler. Numeral 2 designates an exhaust gas sensor constituting an air-fuel ratio sensor and installed in the exhaust system of the engine 1, 3 an air cleaner unit, 4 a carburetor having a carburetor main body 41, a venturi portion 42, a fuel chamber 43, a venturi portion 44, a fuel nozzle 47 a throttle valve 45, and a throttle valve lever 46. Numeral 5 designates air-fuel ratio correcting means, 51 a control valve, 52 a correcting air passage. Numeral 6 designates a pulse motor for actuating the control valve 51, 7 a pulse generator for generating a pulse signal in synchronism with revolutions of the engine. Numeral 8 designates a control circuit section whereby whether the air-fuel mixture is at the desired value is determined in accordance with the output signal of the exhaust gas sensor 2 and the pulse motor 6 is actuated to control the opening of the control valve 51 to correct the air-fuel ratio, 81 a current amplifier for amplifying the output signal of the exhaust gas sensor 2, 82 and 83 comparators for comparing the amplified signal voltage with a predetermined voltage, 84 a NOT circuit, 85 and 86 NAND circuits, 87 a driving circuit for the pulse motor 6, 88 a battery, 89 a pulse frequency divider comprised of flip-flops and adapted to divide the frequency of pulses from the pulse generator 7. Designated as $R_1$, $R_2$, $R_3$, $R_4$, $R_5$, $R_6$ and $R_7$ are resistors, $C_1$ a capacitor. Numeral 9 designates an acceleration/deceleration sensor comprising a diaphragm which may be displaced during a transient state of the intake manifold vacuum, 91 a casing for the acceleration/deceleration sensor, 92 and 93 balancing pack springs, 94 a throttle nozzle, 95 a shaft fastened to the diaphragm, 96 a sliding terminal connected to the shaft 95, 97 and 98 terminals adapted to contact with a contact point 95a at the end of the shaft 95, 100 a transfer relay.

With the construction described above, the first embodiment operates as follows. Under normal operating conditions of the engine, the vacuum within the intake manifold 12 is practically maintained at a constant value so that there is no difference in pressure between diaphragm chambers 9a and 9b in the acceleration/deceleration sensor 9 and the shaft 95 is not displaced keeping the contact point 95a out of contact with either of the terminals 97 and 98. Consequently, contacts 101 and 102 of the relay 100 are closed and pulse signals having a relatively low frequency are supplied to the NAND circuits 85 and 86 from an output terminal 89a of the frequency divider 89.

Figure 4A:
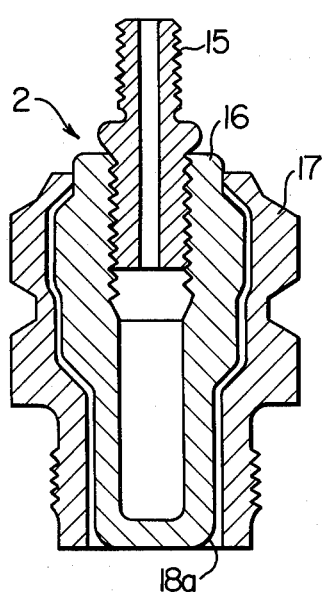
FIGS. 4(a) and 4(b) show respectively a sectional view and a characteristic diagram of the exhaust gas sensor in the embodiment of FIG. 1.
Figure 4B:
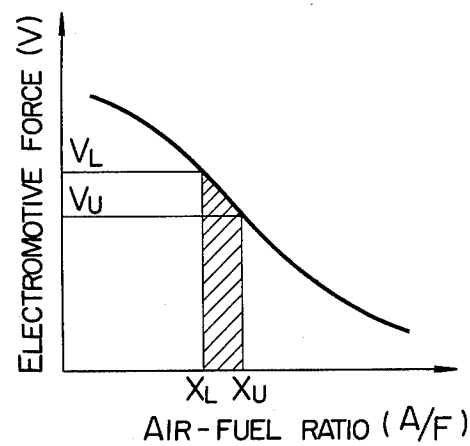

On the other hand, as shown in FIG. 4(a), the exhaust gas sensor 2 is comprised of an electrode 15, a metal oxide 16 primarily consisting of zirconium dioxide, a nickel coating applied to the surface of the metal oxide 16 and an outer case 17 constituting another electrode. The electromotive force V of the sensor 2 is given by a relationship V α log $P_0/P_1$, where $P_0$ is the partial pressure of oxygen in the exhaust gases and $P_1$ is the partial pressure of oxygen in the atmosphere. This relationship is shown in the characteristic diagram of FIG. 4(b).

This output signal of the sensor 2 is amplified by the current amplifier 81, whereby when the detected air-fuel ratio is smaller than a preset air-fuel ratio $X_L$, it is larger than a preset voltage $V_L$ of the comparator 82. Thus, the outputs of the comparators 82 and 83 become "0" level and a "1" level signal is applied only to the NAND circuit 85 through the NOT circuit 84 to actuate the pulse motor 6 and increase the air-fuel ratio. On the other hand, when the air-fuel ratio is greater than a preset air-fuel ratio $X_U$, the output signal of the current amplifier 81 is smaller than a preset voltage $V_U$ of the comparator 83 so that the outputs of the comparators 82 and 83 become "1" level and a "1" level signal is therefore applied only to the NAND circuit 86, whereby the pulse motor 6 is operated in the reverse direction to decrease the air-fuel ratio.

Further, during the transient period of the engine, e.g., during a rapid acceleration or deceleration period, there is a rapid change of the vacuum within the intake manifold 12 and a differential pressure is produced between the diaphragm chambers 9a and 9b in the acceleration/deceleration sensor 9. In the case of a rapid acceleration, the contact point 95a of the shaft 95 engages the terminal 97, whereas in the case of a rapid deceleration the contact point 95a engages the terminal 98. Consequently, the current from the battery 88 flows to the coil of the relay 100 and its contacts 101 and 103 are closed, supplying pulse signals of relatively high frequency to the pulse motor 6 from an output terminal 89b of the frequency divider 89. While, during the transient period of the engine, the direction of rotation of the pulse motor 6 is determined and the air-fuel ratio is corrected in accordance with the output signal of the exhaust gas sensor 2 in the similar manner as under the normal operating conditions of the engine, the controlling speed of the control valve 51 is increased since the frequncey of pulses supplied to the pulse motor 6 is higher.

Figure 5:
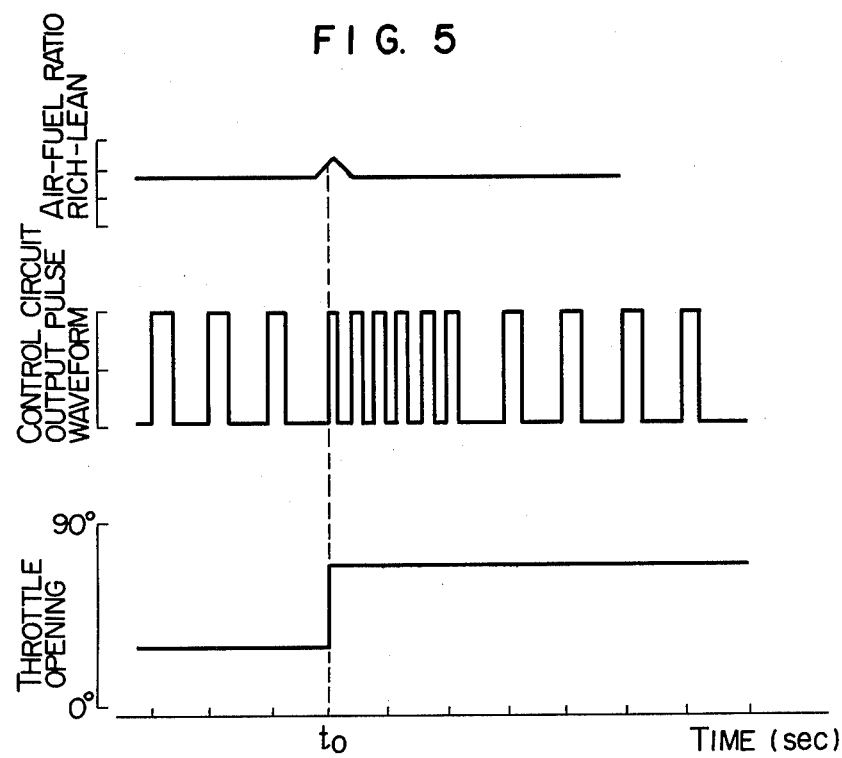
FIG. 5 is a waveform diagram useful for explaining the operation of the control circuit in the embodiment of FIG. 1.

Next, the operation of the pulse motor 6 will be described with reference to FIG. 2. The outputs of the NAND circuits 85 and 86 are respectively applied to terminals h and i of a shift register 87a in the pulse motor driving circuit 87. The shift register 87a may for example be the PS-IL manufactured by K. K. Nippon Pulse Motor Company. The outputs of the shift register 87a are connected to a switching circuit comprising transistors $T_1$, $T_2$, $T_3$ and $T_4$ and counter electromotive force absorbing diodes $D_1$, $D_2$, $D_3$ and $D_4$, and the transistor collector terminals are respectively connected to coils $C_{11}$, $C_{12}$, $C_{13}$ and $C_{14}$ for the respective phases of the pulse motor 6. When pulse signals are applied to the terminal h, as shown in FIG. 3(a), the respective output terminals $\overline{O}_1$, $\overline{O}_2$, $\overline{O}_3$ and $\overline{O}_4$ of the shift register 87a are successively shifted. Consequently, the transistors $T_1$, $T_2$, $T_3$ and $T_4$ are turned on and the coils $C_{11}$, $C_{12}$, $C_{13}$ and $C_{14}$ are similarly energized two phases at a time to rotate the rotor of the pulse motor 6 in the direction of an arrow in the illustration. When this occurs, the control valve 51 is rotated in a direction that closes it and decreases the correcting air quantity. When the pulse signals are applied to the terminal i, the reverse becomes the case as shown in FIG. 3(b) and the pulse motor 6 is rotated in a direction opposite to that of the arrow. Consequently, the control valve 51 is rotated in a direction that opens it and thus the correcting air quantity is increased. In this case, if, for example, the opening of the throttle valve 45 is rapidly changed for acceleration or deceleration as shown in FIG. 5, the frequency of the pulses supplied to the pulse motor 6 is increased by the action of the previously mentioned acceleration/deceleration sensor 9, and in this way the rotational speed of the pulse motor 6 is increased to speed up the correction of the air-fuel ratio.

Figure 6:
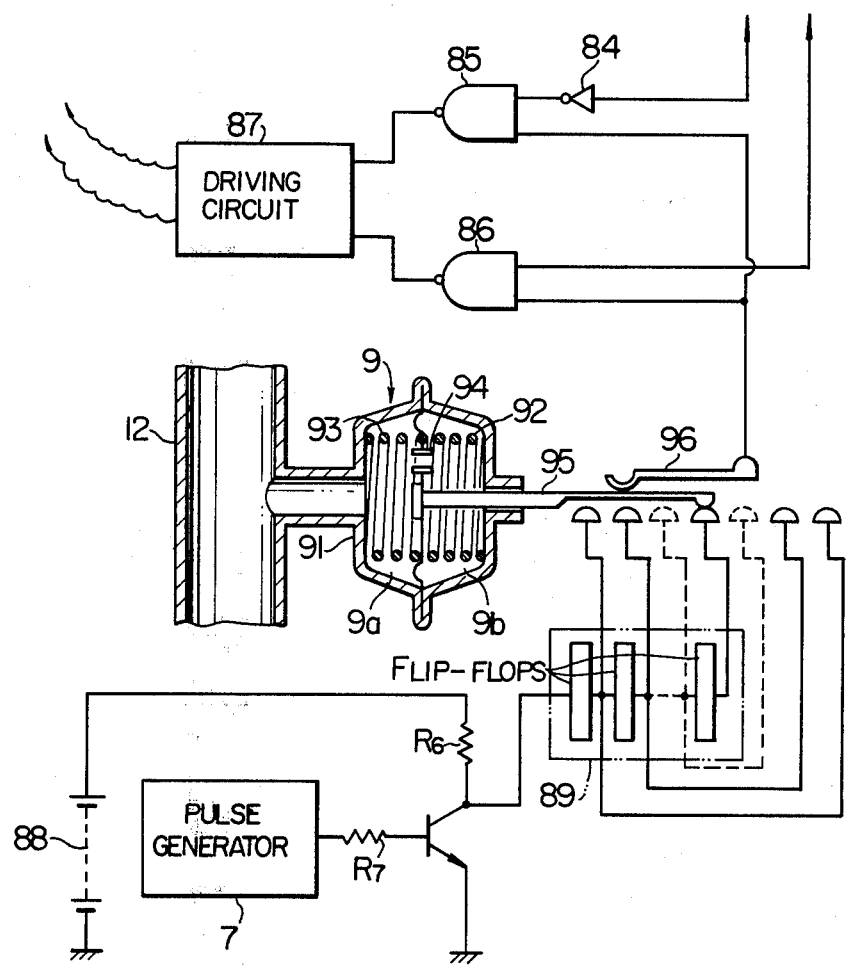
FIG. 6 is a schematic diagram showing a modification of the embodiment of FIG. 1.

FIG. 6 illustrates a modification of the first embodiment which differs from the latter in that instead of the terminals 97 and 98, the acceleration/deceleration sensor 9 is provided with a number of terminals so that pulses of three or more different frequencies may be provided. In this way, contrary to the first embodiment, it is possible to vary the frequency of the pulses supplied to the pulse motor 6 in accordance with the acceleration and deceleration driving conditions of the engine.

By further increasing the response characteristic and correction factor of the control valve, it is possible to effect the correction of fuel-air ratio more rapidly and positively.

While, in the embodiments described above, the acceleration/deceleration sensor 9 is of the type in which the intake manifold vacuum is introduced to produce a differential pressure across the diaphragm and detect the transient state, the present invention is not limited to it and it is of course possible to use any of those in which a piston is displaced, a differential transformer is employed or the transient displacement of the throttle valve 4 is detected.

Further, while, in the embodiments described above, the correction of air-fuel mixture ratio is effected by adjusting the air quantity, the air-fuel ratio may be corrected by adjusting the fuel quantity by a similar mechanism employing a pulse motor and a control valve.

It should be appreciated from the foregoing description that in accordance with the first embodiment of the invention there is provided a negative feedback type air-fuel mixture ratio correcting system for an internal combustion engine, which comprises an air-fuel ratio sensor for detecting the air-fuel ratio of the mixtures fed to the engine, air-fuel ratio correcting means having a control valve and a pulse motor for actuating the control valve, and a control circuit for controlling the air-fuel ratio correcting means in accordance with the output signal of the air-fuel ratio sensor whereby the frequency of pulse signals synchronized with the number of revolutions of the engine is varied in accordance with the output signal of an acceleration/deceleration sensor which detects transient conditions of the engine to thereby supply the pulse signals to the pulse motor. Thus, there is an advantage that the air-fuel ratio may be positively and rapidly corrected even during transient periods of the engine, e.g., a rapidly accelerating or decelerating operating condition of the engine. In this way, it is possible to maintain the air-fuel mixture at its correct value which is extremely advantageous from the exhaust emission control point of view and make a great contribution toward solving the problems of air polution.

Further, it must be noted that in these embodiments the pulse motor 6 is used which is small and compact and which provides a high torque, and moreover there is no need to use a complicate current converting circuit as is the case when a DC power supply is utilized. Thus, the electric circuit for driving the pulse motor is made simpler in construction and at the same time the accuracy and response characteristic of the air-fuel ratio control are improved.

SECOND EMBODIMENT

Figure 7:
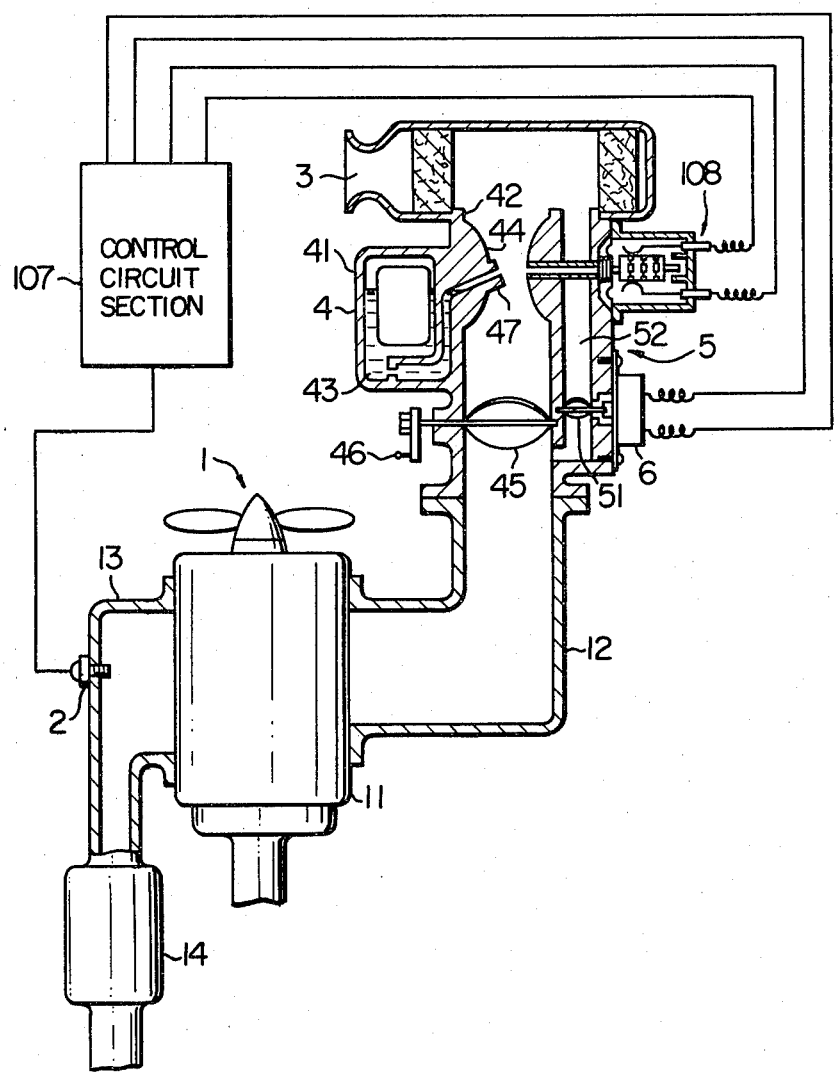
FIG. 7 is a schematic diagram showing the construction of a second embodiment of the invention.

The second embodiment of the invention will now be described by referring first to FIG. 7 in which the like reference numerals as used in FIG. 1 designate the like elements. In FIG. 7, numeral 107 designates a control circuit section for supplying pulse signals to the pulse motor 6 to operate it, 108 a drawn air quantity sensor mounted at the venturi portion 44 of the carburetor 4. The drawn air quantity sensor 108 is illustrated in detail in FIG. 8, in which numeral 181 designates a vacuum sensing port opened into the venturi portion 44 whereby in accordance with the pressure from an air cleaner, inner pressure outlet port 183 and the vacuum at the venturi portion 44, a diaphragm 182 is displaced to detect the amount of air drawn. Numeral 184 designates a spring, 185 a rod linked to the diaphragm 182, 186a through 186c switching resistors mounted on the rod 185, 187a through 187c switching resistor contacts with which a brush 188 contact, 189 output terminals at the ends of the brush 188.

Figure 9:
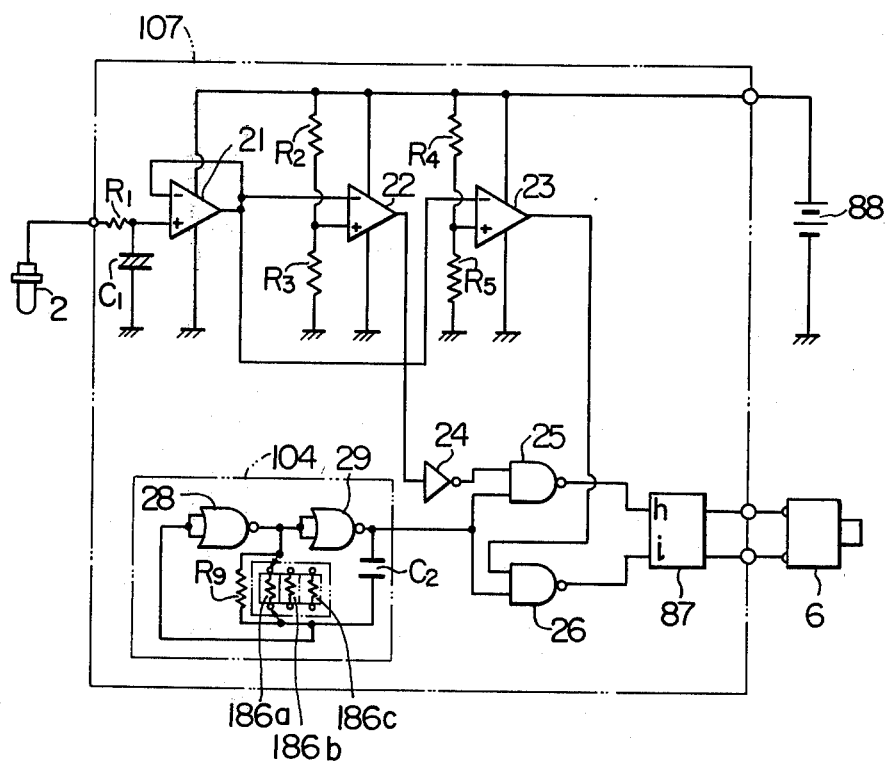
FIG. 9 is a circuit diagram showing an exemplary form of the control circuit in the embodiment of FIG. 7.

The control circuit section 107 will be described with reference to the wiring diagram of FIG. 9, in which numeral 21 designates a current amplifier for amplifying the output signal of the exhaust gas sensor 2, 22 and 23 comparators for respectively comparing the amplified signal voltage with a preset voltage, 24 a NOT circuit, 25 and 26 NAND circuits, 87 the previously described driving circuit for the pulse motor 6 (FIG. 2), 28 and 29 NOR circuits, 104 a pulse oscillating circuit, 88 the battery, $R_1$ through $R_5$ resistors. $C_1$ and $C_2$ capacitors. The oscillation frequency of the pulse oscillating circuit 104 is determined by the capacitor $C_2$, a resistor $R_9$ and any one of the switching resistors 186a to 186c.

Figure 8:
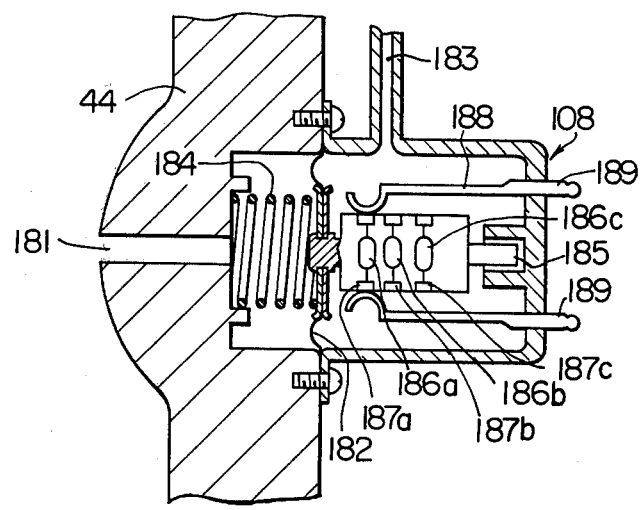
FIG. 8 is a sectional view of the drawn air quantity sensor in the embodiment of FIG. 7.

With the construction described above, the second embodiment operates as follows. In the operating range of the engine where the amount of air drawn thereinto is small, e.g., when the engine is operating at a low speed, the vacuum produced at the venturi portion 44 is low and therefore there is a small pressure difference between it and the internal pressure of the air cleaner. Consequently, the diaphragm 182 is not displaced due to the biasing force of the spring 184 and the brush 188 is in contact with the contacts 187a as shown in FIG. 8, with the result that the pulse oscillating circuit 104 in the control circuit section 107 oscillates at a relatively low frequency which is determined by the resistors $R_9$ and 186a and the capacitor $C_2$. On the other hand, the exhaust gas sensor 2 used in this embodiment has the previously described output characteristic of FIG. 4 and its output signal is amplified by the current amplifier 21, whereby when the air-fuel ratio of the mixture is smaller than a preset air-fuel ratio $X_L$, the outputs of the comparators 22 and 23 become "0" level and a "1" level signal is applied only to the NAND circuit 25 through the NOT circuit 24. Consequently, the pulse signals from the pulse oscillating circuit 104 are supplied to the pulse motor 6 to operate it and the control valve 51 is actuated to increase the amount of auxiliary air and thereby to control the air-fuel mixture ratio at the desired air-fuel ratio. On the other hand, when the air-fuel mixture ratio is greater than a preset air-fuel ratio $X_U$, the outputs of the comparators 22 and 23 become "1" level and a "1" level signal is applied only to the NAND circuit 26, so that the pulse motor 6 is rotated in the reverse direction and the air-fuel mixture ratio is decreased to control it at the desired air-fuel ratio. In this case, when the air-fuel mixture ratio lies between the preset air-fuel ratios $X_L$ and $X_U$, the control valve 51 is not actuated. When the engine speed increases so that an increase amount of air is drawn into the engine, the difference between the vacuum at the venturi and the internal pressure of the air cleaner increases, with the result that the diaphragm 182 is displaced against the spring 184 and the brush 188 engages either the contacts 87b or the contacts 87c. Consequently, the oscillation frequency of the pulse oscillating circuit 104 is increased as compared with that obtained in the previously described low engine speed range, and the rotational speed of the pulse motor 6 and hence the control speed of the control valve 51 are increased to permit the air-fuel mixture ratio to be controlled at the desired air-fuel ratio with an improved follow-up characteristic.

Figure 2:
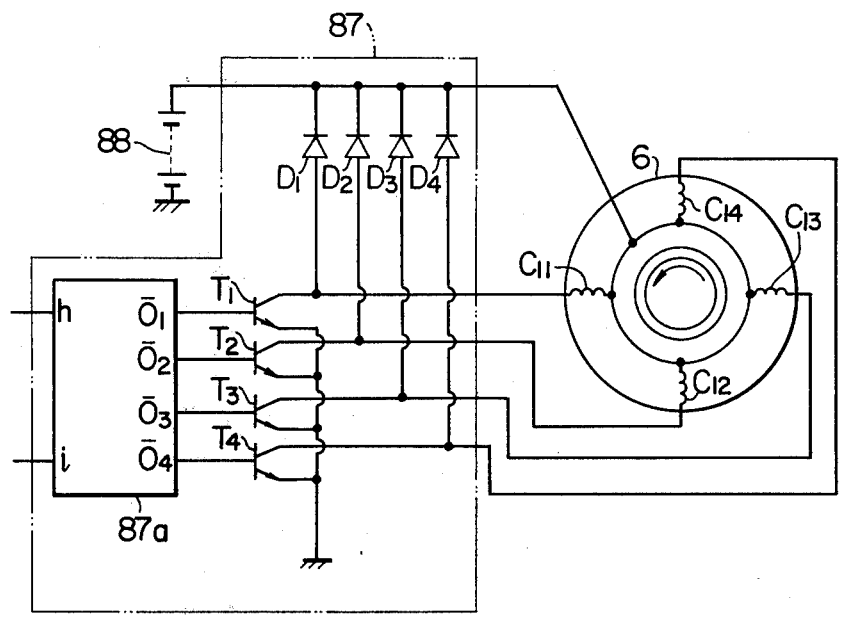
FIG. 2 is a circuit diagram showing an exemplary form of the driving circuit in the embodiment of FIG. 1.
Figure 3A:
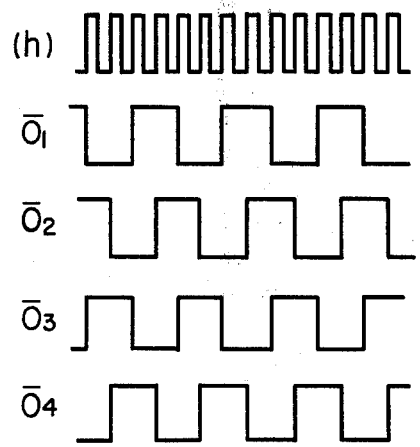
FIGS. 3(a) and 3(b) are waveform diagrams useful for explaining the operation of the shift register shown in FIG. 2.
Figure 3B:
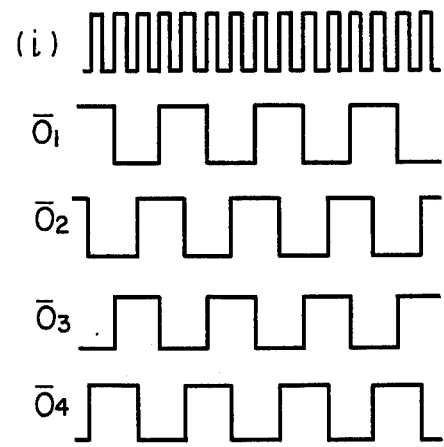

The pulse motor 6 and the pulse motor driving circuit 87 are identical in construction with those shown in FIG. 2. Accordingly, when pulse signals are applied to the terminal h, as shown in FIG. 3(a), the output terminals $\overline{O}_1$, $\overline{O}_2$, $\overline{O}_3$ and $\overline{O}_4$ of the shift register 87a are sucessively shifted so that the transistors $T_1$, $T_2$, $T_3$ and $T_4$ are turned on and the coils $C_{11}$, $C_{12}$, $C_{13}$ and $C_{14}$ are similarly energized two phases at a time to thereby rotate the rotor of the pulse motor 6 in the direction of the arrow in FIG. 2. On the other hand, when the pulse signals are applied to the terminal i, the reverse becomes the case as shown in FIG. 3(b) and the pulse motor 6 is rotated in a direction opposite to that of the arrow. The rotational speed of the pulse motor 6 is determined by the frequency of the pulse signals from the pulse oscillating circuit 104.

Figure 10:
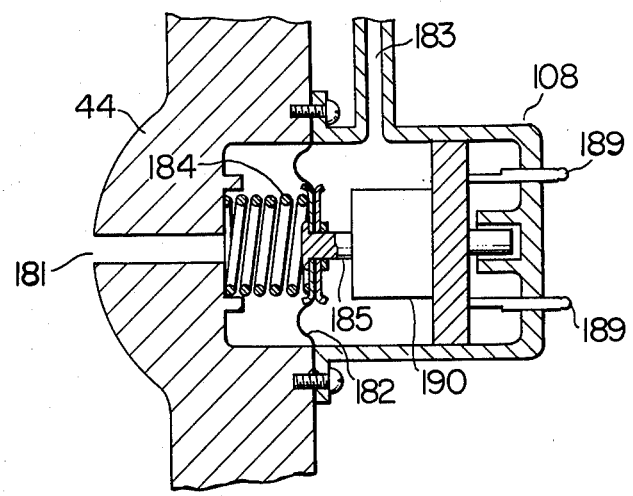
FIG. 10 is a sectional view showing another form of the drawn air quantity sensor of FIG. 8.
Figure 11:
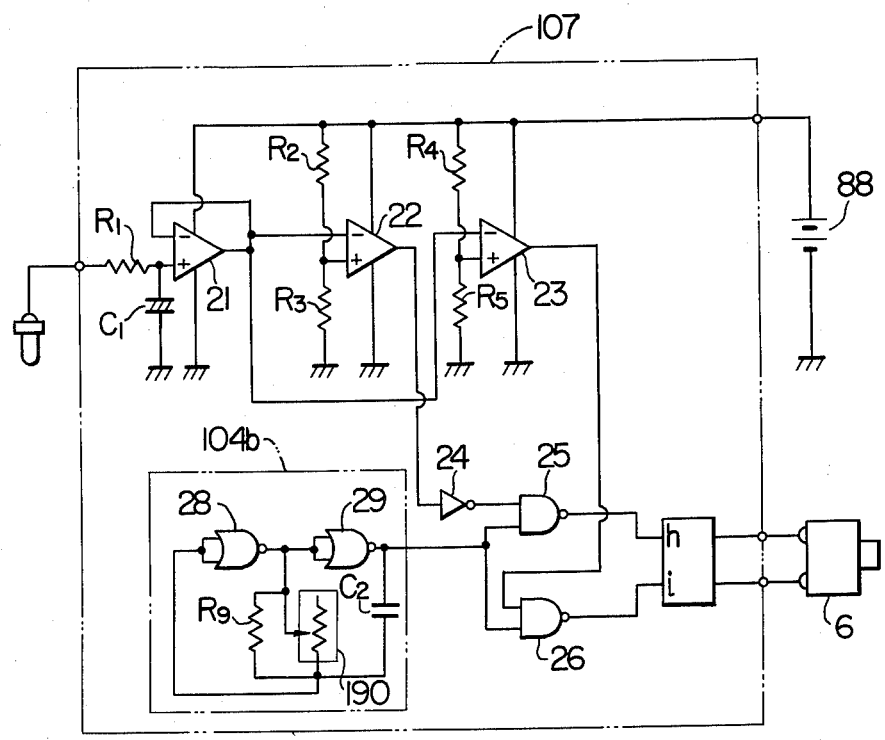
FIG. 11 is a circuit diagram showing another form of the control circuit suitable for use with the drawn air quantity sensor of FIG. 10.

A modification of the second embodiment will now be described with reference to FIGS. 10 and 11. In this modification, a variable resistor 190 is employed in place of the switching resistors in the drawn air quantity sensor 108. Thus, by designing the variable resistor 190 so that its resistance value decreases as the amount of drawn air flow increases, the oscillation frequency of a pulse oscillating circuit 104b increases to increase the rotational speed of the speed motor. In this way, it is possible to effect the correction of the air-fuel mixture ratio more positively and with an improved follow-up characteristic.

While, in the second embodiment described above, the drawn air quantity sensor 108 is of the type in which the diaphragm 182 is displaced in accordance with the vacuum at the venturi, it may of course be one in which a piston is displaced in place of the diaphragm 182 or alternately the displacement of the throttle valve 45 is detected. Further, while the correcting air passage is provided as an air-fuel ratio correcting means and the correction of air-fuel ratios is effected through adjustment of air quantity, it is possible to effect the correction of air-fuel ratios through compensation of fuel requirements by a similar mechanism employing a pulse motor and a control valve.

It will thus be seen from the foregoing description that since the system according to the second embodiment comprises an air-fuel ratio sensor for detecting the air-fuel ratio of the mixtures fed to an engine, air-fuel ratio correcting means having a control valve and a pulse motor for actuating the control circuit section whereby the oscillation of pulse signals from a pulse oscillating circuit is determined by the output signal of a drawn air quantity sensor for detecting the amount of air drawn into the engine and the pulse signals from the pulse oscillating circuit are supplied to the pulse motor of the air-fuel ratio correcting means in accordance with the output signal of the air-fuel ratio sensor, the air-fuel ratio of the mixtured can be corrected to the desired air-fuel ratio with an improved follow-up characteristic throughout the entire range of air amounts drawn into the engine, and thus the air-fuel mixture can be maintained at the correct air-fuel ratio which is highly advantageous from the exhaust emission control point of view, thereby greatly contributing toward the prevention of air pollution.

THIRD EMBODIMENT

Figure 12:
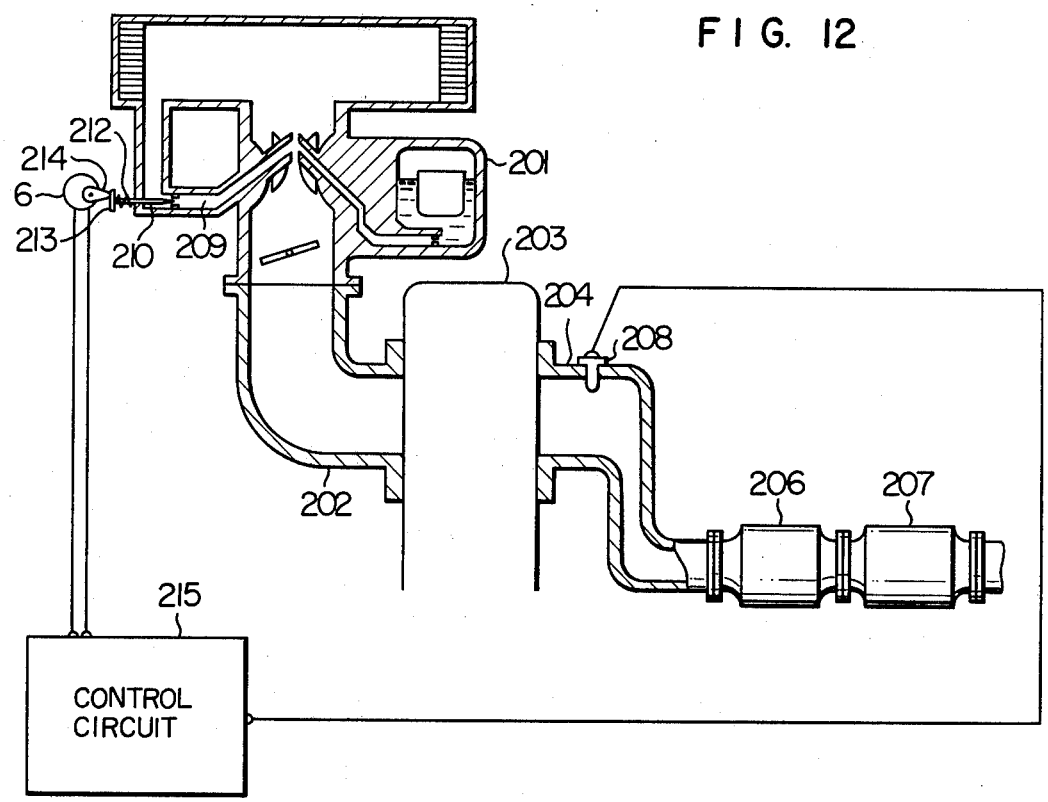
FIG. 12 is a schematic diagram showing the construction of a third embodiment of the invention.

The third embodiment of the invention will now be described with reference to FIG. 12. In FIG. 12, numeral 201 designates a carburetor body, 202 an intake manifold, 203 an engine body, 204 an exhaust manifold, 206 a reduction catalyst, 207 an oxidation catalyst, 208 an exhaust gas sensor installed in the exhaust manifold 204 to detect the air-fuel mixture ratio from the exhaust gas composition, 209 a mixture correcting auxiliary air passage, 210 a control valve for varying the cross-sectional area of the air passage 209, 6 a pulse motor for actuating the control valve 210, 212 a spring for placing a seat 213 and a cam 214 in contact with each other, 214 a cam mounted on the shaft of the pulse motor 6, 215 a control circuit for controlling the rotation of the pulse motor 6 in accordance with the output signal of the exhaust gas sensor 208.

Figure 13A:
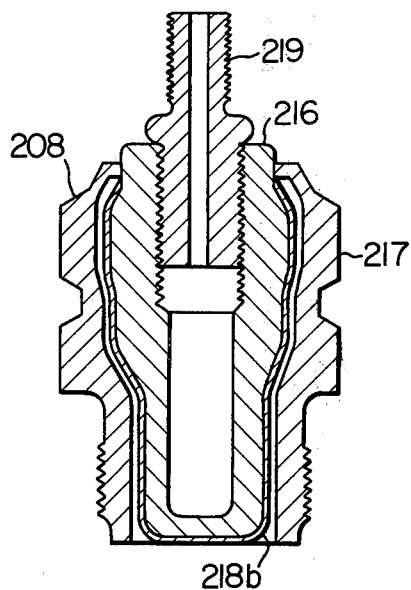
FIGS. 13(a) and 13(b) respectively show a characteristic diagram and a sectional view of the exhaust gas sensor in the embodiment of FIG. 12.
Figure 13B:
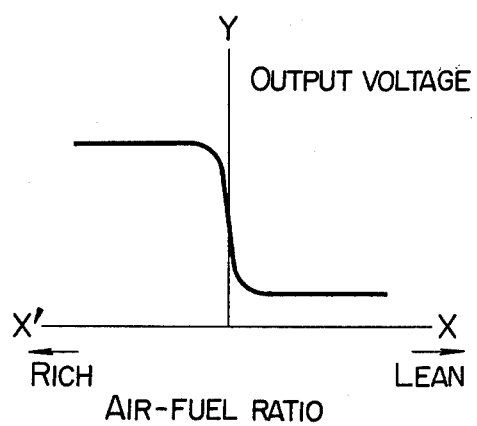

The exhaust gas sensor 208 comprises, as shown in FIG. 13(b), an electrode 219, a metal oxide 216 primarily consisting of zirconium dioxide, a platinum coating 218b applied on the surface of the metal oxide 216 and an outer case 217 constituting a second electrode. The exhaust gas sensor 208 exhibits an output characteristic as shown in FIG. 13(a) by the combined effects of the exhaust gas cleaning catalytic action of the platinum 218b and the oxygen partial pressure detecting action of the metal oxide inner shell, and the air-fuel mixture ratio obtained at a point a where an abrupt change occurs in the output voltage substantially corresponds to the theoretical air-fuel mixture ratio. In this third embodiment, this point is utilized to correct the air-fuel ratio of the mixtures to attain the theoretical air-fuel ratio.

Figure 14:
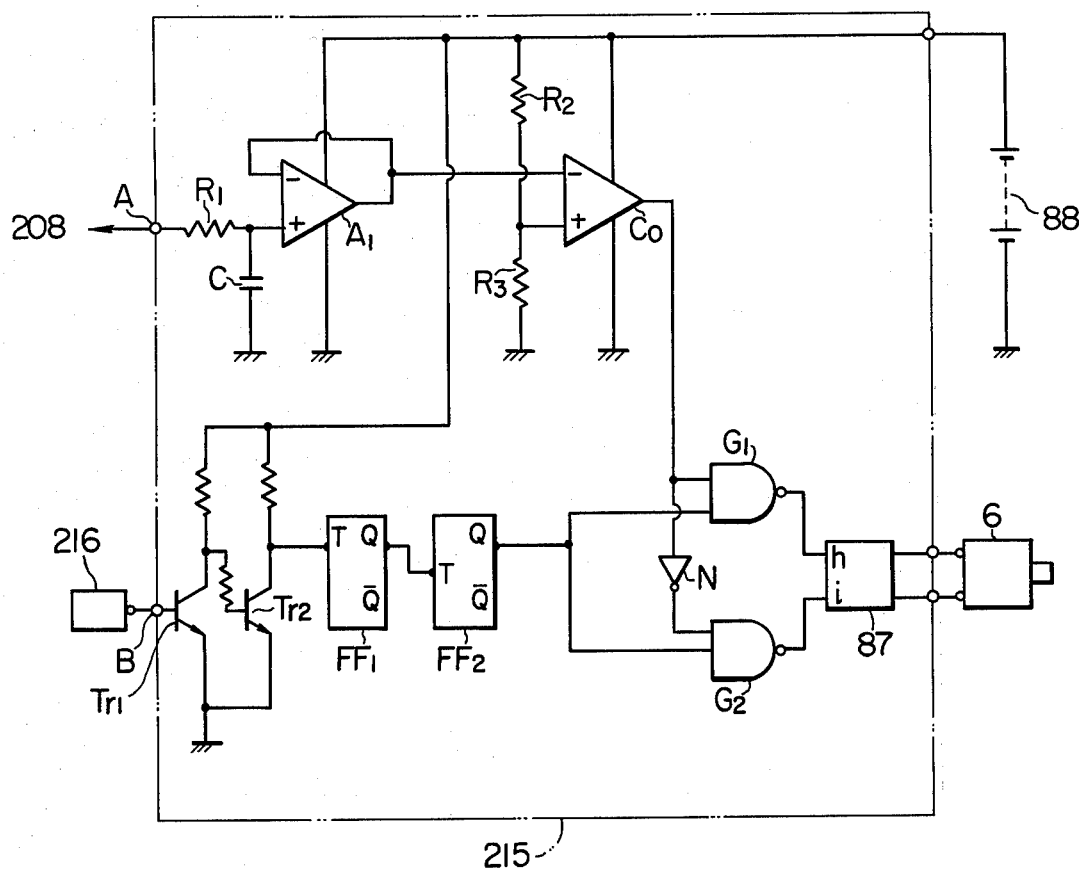
FIG. 14 is a circuit diagram showing an exemplary form of the control circuit in the embodiment of FIG. 12.

The circuit construction of the control circuit 215 will be described with reference to FIG. 14 showing an exemplary form of the control circuit 215. A terminal B is connected to a contact 216 which is opened and closed in synchronism with revolutions of the engine. When the contact 216 is closed, a transistor $T_{r1}$ is turned off and a transistor $T_{r2}$ is turned on. When this process is repeated twice, a flip-flop $FF_1$ produces a pulse and for every two pulses received by the $FF_1$, an $FF_1$ produces a pulse. Therefore, the frequency of the signals from the contact 216 synchronized with the engine revolutions is divided by a factor of 4 by the $FF_2$. A terminal A is connected to the exhaust gas sensor 208 whose output voltage is subjected to current amplification by an amplifier $A_1$ and it is then compared with a preset voltage in a comparator $C_0$. This preset voltage is determined by resistors $R_2$ and $R_3$ and it has a value which is intermediate of the maximum and minimum output values of the sensor 208. The output of the comparator $C_0$ is applied to a NAND gate $G_2$ through a NAND gate $G_1$ and an inverter N. Numeral 87 designates the driving circuit for operating the pulse motor 6 whereby the pulse motor 6 is rotated in a forward direction with pulse signals from the NAND gate $G_1$, whereas the motor 6 is rotated in a reverse direction by pulse signals from the NAND gate $G_2$. The pulse motor 6 and the driving circuit 87 have already been described in detail and therefore they will not be explained further.

With the construction described above, the third embodiment operates as follows. When the air-fuel ratio of the mixture is smaller than the theoretical air-fuel ratio and the mixture is rich, the output of the exhasut gas sensor 208 is high as shown in FIG. 13(a) and the output of the comparator $C_0$ is at a "0" level. Thus, only the NAND gate $G_2$ is opened and the pulses from the flip-flop $FF_2$ proportional to the engine revolutions are applied to the driving circuit 87 to rotate the motor 6, with the result that the control valve 210 is displaced through the cam 214 in a direction that increases the cross-sectional area of the auxiliary air passage 209 and in this way the mixture is made lean out to attain the theoretical air-fuel ratio. On the other hand, when the air-fuel mixture is weak, the output of the comparator $C_0$ is at a "1" level so that only the NAND gate $G_1$ is opened and the pulses from the $FF_2$ proportional to the engine revolutions are applied to the driving circuit 87. Consequently, the motor 6 is rotated in a direction opposite to that when the mixture is rich and thus the control valve 210 reduces the cross-sectional area of the auxiliary air passage 209 to reduce the auxiliary air quantity and enrich the mixture until the theoretical air-fuel ratio is attained.

While, in the third embodiment described above, the correction of air-fuel ratios is accomplished through the provision of an auxiliary air passage, it is possible to effect the correction of air-fuel ratios by providing an auxiliary fuel passage within the carburetor or by changing the flow rate of the fuel through the main fuel passage in the carburetor. Further, while the oxygen concentration in the exhaust gases is detected by a metallic oxide as a substitute for the air-fuel mixture ratio, the concentration of for example carbon monoxide, hydrogen or carbon dioxide may be detected by another metallic oxide. Otherwise, it is possible to detect the air-fuel ratio by the variation of an engine condition, e.g., engine torque variation.

It will thus be seen from the foregoing description that since in the third embodiment the flow rate of either the auxiliary air supplied to an internal combustion engine or the fuel fed to the engine is controlled by a control valve and this control valve is actuated by a pulse motor operated by pulses of a frequency proportional to the engine speed, there is a great advantage that not only the air-fuel ratio of the mixtures can be controlled at the ideal air-fuel ratio at all times, but also the system is highly effective in eliminating those problems such as the occurrence of hunting phenomenon during corrections and the problem of response characteristic, and moreover the system operates quite satisfactorily during rapid acceleration and deceleration operations of an engine and it can provide corrections with a high degree of accuracy.

FOURTH EMBODIMENT

Figure 15:
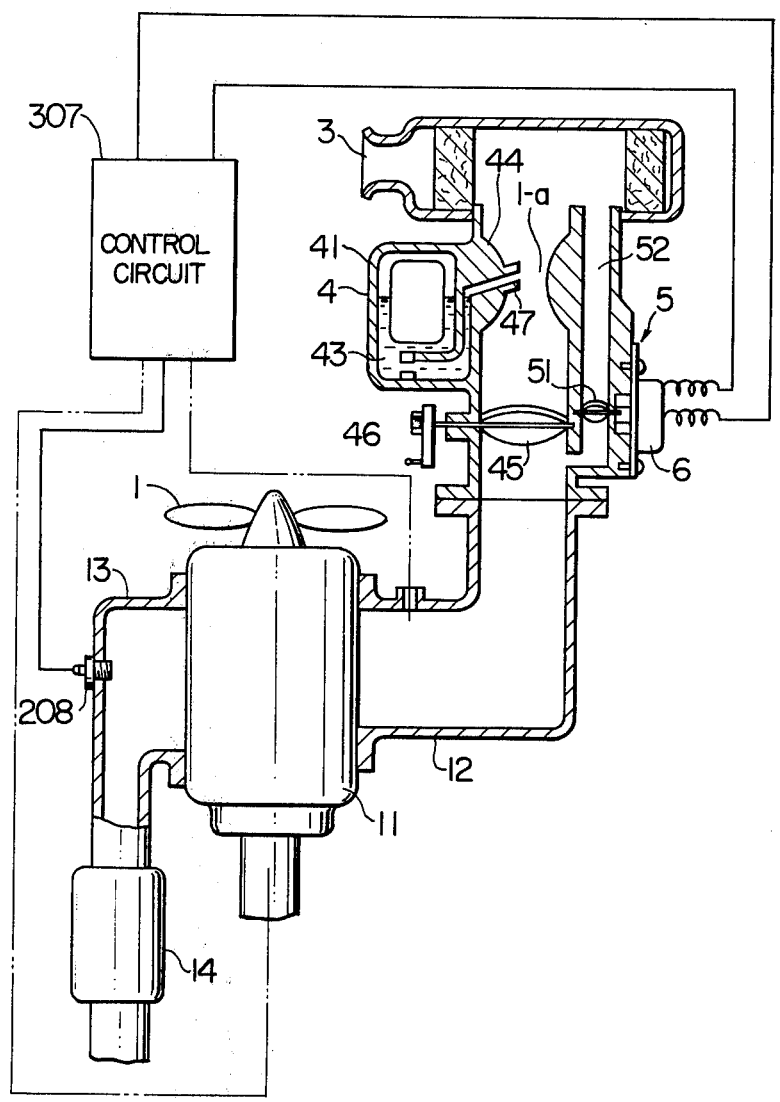
FIG. 15 is a schematic diagram showing the construction of a fourth embodiment of the invention.

The fourth embodiment of the invention will now be described with reference to FIG. 15. As will be seen from FIG. 15, the fourth embodiment is similar to the second embodiment of FIG. 7. Therefore, like reference numerals designate like elements. The fourth embodiment differs from the embodiment of FIG. 7 in that the drawn air quantity sensor 108 is eliminated, the control circuit section 107 is replaced with a control circuit 307 of a different construction and the air-fuel ratio sensor 2 is replaced by the air-fuel ratio sensor 208 shown in FIG. 13(b).

Figure 16:
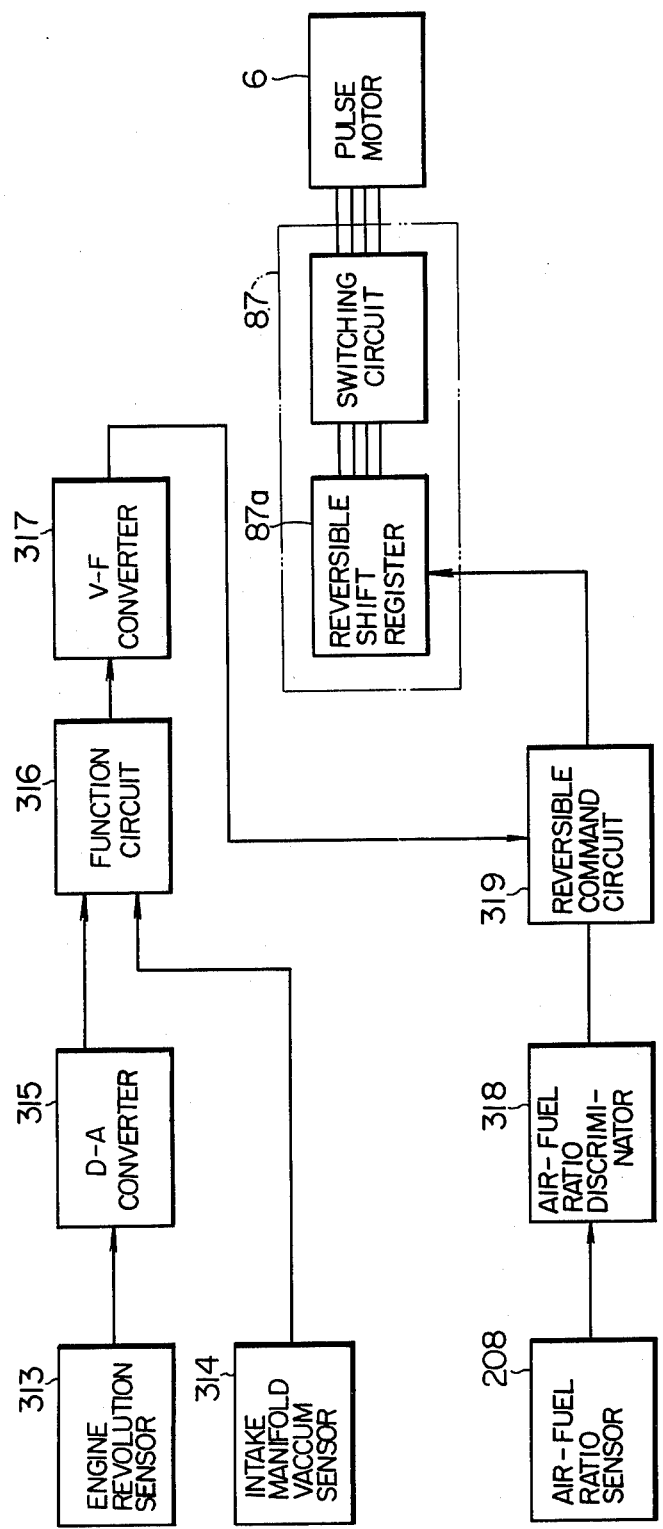
FIG. 16 is a block diagram of the control circuit used in the embodiment of FIG. 15.
Figure 19:
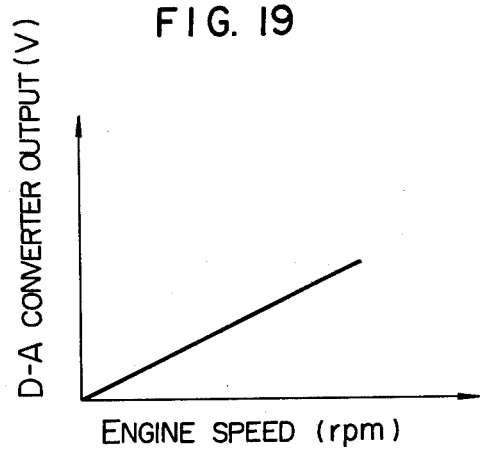
FIG. 19 is a characteristic diagram showing the relationship between the engine speed and the output of the D-A converter shown in FIG. 17.
Figure 20:
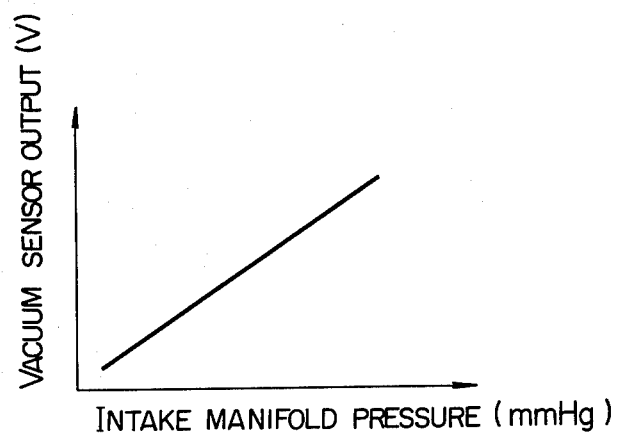
FIG. 20 is a characteristic diagram of the intake manifold vacuum sensor shown in FIG. 17.
Figure 21:
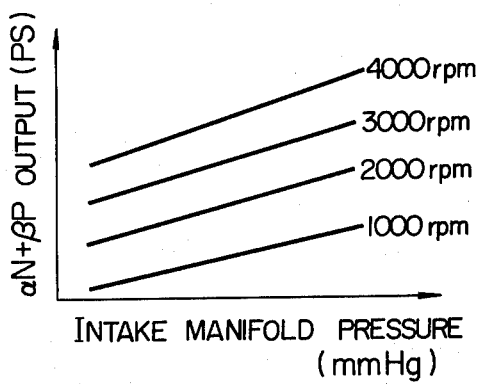
FIG. 21 is an output characteristic diagram of the function circuit shown in FIG. 17.

In FIGS. 16 and 17, there are respectively shown a block diagram and a wiring diagram of the control circuit 307. In FIGS. 16 and 17, numeral 313 designates an engine revolution sensor having a contact synchronized with the revolutions of the engine and adapted to generate ON and OFF signals synchronized with the engine revolutions. The ON and OFF signals from the engine revolution sensor 313 are converted, as shown in FIG. 19, into a substantially linear positive DC voltage by a digital-analog converter 315 comprised of a reshaping circuit composed of resistors $R_{101}$ and $R_{102}$ and a transistor $T_{103}$ and an integrating circuit composed of capacitors $C_{104}$ and $C_{107}$, diodes $D_{105}$ and $D_{106}$ and a resistor $R_{108}$. Numeral 314 designates an intake manifold vacuum sensor designed so that a diaphragm or bellows is displaced by the engine intake manifold vacuum to vary the resistance of a potentiometer 314-1 in accordance with its displacement. One end of the potentiometer 314-1 is grounded and the other end is connected to a power source through a resistor $R_{114}$, and the potential at the point (a) in FIG. 17, i.e., the output of the vacuum sensor 314 varies as shown in FIG. 20. Numeral 316 designates a function circuit comprised of a known adder circuit consisting of resistors $R_{109}$, $R_{110}$, $R_{111}$ and $R_{112}$ and a differential amplifier $A_{113}$, whereby the outputs of the D-A converter 315 and the intake manifold vacuum sensor 314 are respectively applied through the resistors $R_{110}$ and $R_{111}$ to the noninverting input terminal of the differential amplifier $A_{113}$ and converted by this function circuit 316 into a function $\alpha N + \beta P$ of the characteristic shown in FIG. 21, where N is an engine speed function, P is an intake manifold pressure function and $\alpha$ and $\beta$ are constants.

Figure 18:
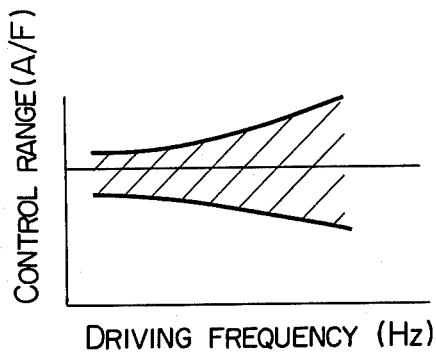
FIG. 18 is a driving frequency versus air-fuel ratio control range characteristic diagram of the pulse motor in the embodiment of FIG. 15.
Figure 22:
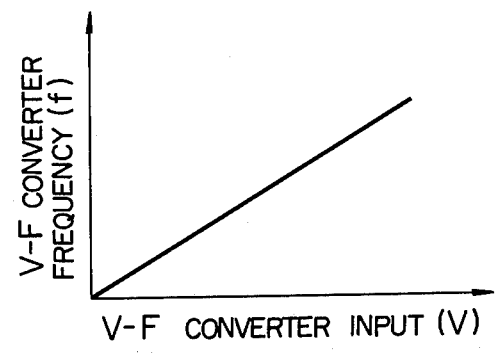
FIG. 22 is an output characteristic diagram of the voltage-frequency converter shown in FIG. 17.

While the function circuit 316 is designed to form the function $\alpha N + \beta P$, this function may take many different forms depending on the construction of the control valve 51 which may for example be a butterfly valve, rotary valve or piston valve or depending on the construction of a link mechanism if the control valve 51 is linked to the throttle valve 45 by such a mechanism. Further, while, in this embodiment, the engine revolutions and intake manifold vacuum are employed as parameters, other operating parameters of the engine such as the throttle valve opening and vacuum 1-a at the venturi of the carburetor 4 may be added to or substituted for the first-mentioned two parameters. The output signal of the function circuit 316 is applied to a voltage-frequency converter or V-F converter 317 which in turn generates puse signals. As shown in FIG. 18, the air-fuel ratio control range is determined by the frequencies of pulse signals supplied to the control valve actuating pulse motor 6, and the higher the frequency is the better the response characteristic will be. In other words, the desired air-fuel mixture ratio is attained more quickly, and therefore the pulse motor 6 must be operated at a maximum frequency which is capable of reducing the control range and positively controlling the air-fuel ratio at the desired value. For example, if the frequency of pulse signals synchronized with the engine revolutions is divided by a frequency divider circuit, the resultant pulse width has a fixed value of $\frac{1}{2}^n$ (n=integer) and thus it is impossible to vary the pulse width as desired. It is therefore the purpose of the V-F converter 317 to overcome the difficulty that it is impossible to obtain the optimum frequency for actuating the control valve 51 to attain the desired air-fuel ratio. The V-F converter 317 comprises a charging and discharging circuit consisting of resistors $R_{115}$, $R_{117}$, $R_{119}$ and $R_{120}$, a capacitor $C_{118}$ and a transistor $T_{116}$, a comparator unit consisting of resistors $R_{121}$, $R_{123}$ and $R_{124}$ and a comparator $A_{126}$ for comparing the potentials on both sides of a capacitor $C_{118}$, a reshaping circuit consisting of a transistor $T_{127}$ and a resistor $R_{128}$, and a feedback resistor $R_{125}$, whereby when the potential at a point (b) on one side of the capacitor $C_{118}$ becomes higher than the potential at a point (c) on the other side of the capacitor, the output of the comparator $A_{126}$ goes to a "1" level so that the transistor $T_{116}$ is turned on through the feedback resistor $R_{125}$ and the charge on the capacitor $C_{118}$ is discharged through the resistor $R_{117}$ and the transistor $T_{116}$. When the potential at the point (c) becomes higher than the potential at the point (b), the output of the comparator $A_{126}$ changes from the "1" to "0" level and the transistor $T_{116}$ is turned off to charge the capacitor $C_{118}$ through the resistors $R_{115}$ and $R_{117}$. Repetitions of this process cause oscillations in the V-F converter 317. As shown in FIG. 22, this oscillation frequency increases as the input voltage to the V-F converter 317 or the function circuit output gets higher. The air-fuel ratio sensor 208 for detecting the air-fuel ratio of the mixture employs a metal oxide primarily consisting of zirconium deoxide and a platinum coating is applied on the metal oxide electrode. As previously mentioned in connection with the description of FIGS. 13(a) and 13(b), the characteristic of the air-fuel ratio sensor 208 changes abruptly as shown in FIG. 13(a) in accordance with the oxygen concentration in the exhaust gases by virtue of the combined effects of the catalytic effect of the platinum and the oxygen concentration sensing capacity of the zirconium dioxide. The output of the air-fuel ratio sensor 208 is applied to an air-fuel ratio discriminator 318 consisting of resistors $R_{129}$, $R_{130}$ and $R_{131}$ and a comparator $A_{132}$ to determine whether the air-fuel mixture is on the rich side or it is on the weak side, whereby when the mixture is richer than a preset value the output of the comparator $A_{132}$ is at the "0" level, whereas when the mixture is weaker than the preset value the comparator output is at the "1" level. The preset level of the discriminator 318 is selected to lie between the maximum outputs of the air-fuel ratio sensor 208. The output signal of the discriminator 318 is applied to a reversible command circuit 319 comprised of an inverter circuit $IN_{133}$ and NAND circuits $L_{134}$ and $L_{135}$, whereby when the mixture is weak, the pulse signals from the V-F converter 317 are applied to an input terminal h of a shift register 87a, whereas when the mixture is rich the pulse signals are applied to an input terminal i. The pulse motor driving circuit 87 has been described with reference to FIG. 2 and FIGS. 3(a) and 3(b). Accordingly, when the pulse signals are applied to the terminal h, the rotor of the pulse motor 6 is rotated in the direction of an arrow in FIG. 17 and the control valve 51 is moved in a direction that closes it to decrease the rate of secondary air flow. When the pulse signals are applied to the terminal i, the reverse becomes the case and the control valve 51 is moved in a direction that opens it to increase the ratio of secondary air flow.

The operation of the fourth embodiment described above will now be summarized with reference to the time chart shown in FIG. 23, in which FIG. 23(a) shows the output waveform of the air-fuel ratio sensor 208 at the point (d) in FIG. 17 and the desired air-fuel ratio. When the air-fuel ratio sensor output is greater than the desired air-fuel ratio it represents a rich mixture, whereas when the sensor output is smaller than the desired air-fuel ratio it represents a weak mixture, and the corresponding waveforms at points (f) and (g) in the reversible command circuit 319 are as shown respectively in FIGS. 23(b) and 23(c). In other words, when the mixture is rich, the NAND circuit $L_{135}$ is opened, whereas when the mixture is weak the NAND circuit $L_{134}$ is opened, and in this way the pulse signals are applied to the terminal (i) or (h) of the shift register 87a so that the pulse motor 6 actuates the control valve 51 through the switching circuit as shown in FIG. 23(d). That is, when the mixture is weak the control valve 51 is moved in a direction that closes it, whereas when the mixture is rich it is moved in a direction that opens it, thereby controlling the air-fuel ratio at the desired value. The opening speed of the control valve 51 is increased as the oscillation frequency of the V-F converter 317 is increased, whereas it is moved slower as the oscillation frequency is decreased.

While, in the fourth embodiment described above, the correction method is employed which makes use of the secondary air flow, this embodiment may also be applied to an operation in which the quantity of fuel fed from the carburetor is corrected through the pulse motor 6. Further, this embodiment may be similarly employed with a servo control system used on a vehicle to control the amount of secondary air supplied to the catalytic converter, the choke valve of the carburetor or the speed of the engine.

It will thus be seen from the foregoing description that in accordance with the fourth embodiment, there is provided an air-fuel mixture ratio correcting system which employs a pulse motor as a control valve actuating motor to control the air-fuel mixture ratio. The system comprises a function circuit for generating a function from the signals representing operating parameters of the engine such as the engine speed and the engine intake manifold vacuum, and a V-F converter circuit for generating, from the function circuit output signal, pulse signals whose frequency is varied continuously. Thus, it is possible to employ as the optimum frequency the highest one of all the pulse motor actuating frequencies which can control the air-fuel mixture ratio within the required limits and the pulse motor is controlled with this optimum frequency, thereby eliminating the occurrence of hunting phenomenon under the transient conditions due to the regular acceleration and deceleration of the engine and ensuring excellent response characteristic, i.e., the effectuation of control with excellent follow-up characteristic. Therefore, not only the air-fuel ratio of the mixtures can always be controlled within the proper range under all the operating conditions of the engine, but also with the engine equipped with an exhaust gas cleaning system such as a catalytic converter, the air-fuel ratio of the mixtures can always be controlled at the correct value which ensures the optimum cleaning of the exhaust gases, with the result that the exhaust gas cleaning system such as the catalytic converter is permitted to function normally at all times to prevent the deterioration, breakage, etc. of the system and moreover the optimum operation of the exhaust cleaning system reduces the variations of the cleaned exhaust gases and prevents the pollution of the atmospher by the exhaust gases.

FIFTH EMBODIMENT

Figure 24:
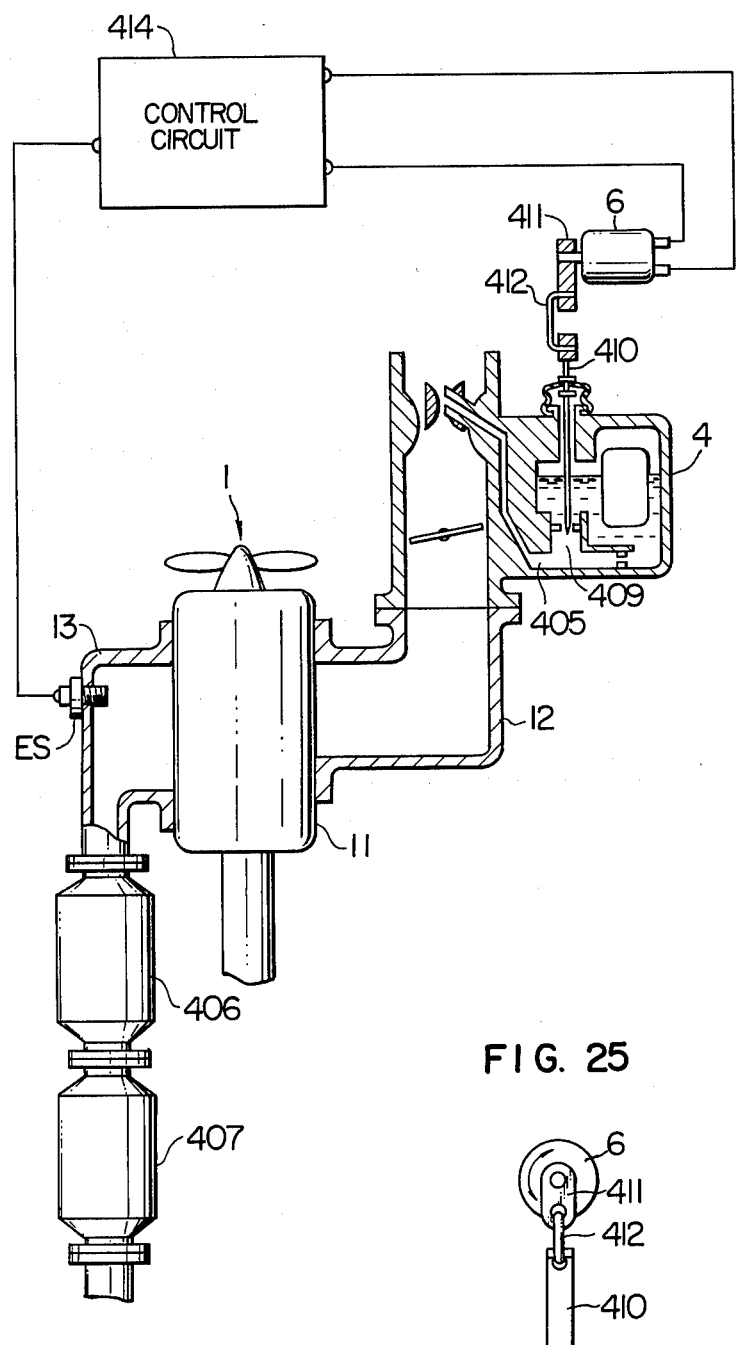
FIG. 24 is a schematic diagram showing the construction of a fifth embodiment of the invention.
Figure 25:
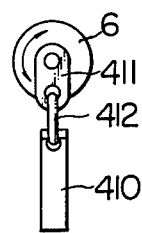
FIG. 25 is a side view showing the principal part of the pulse motor driving unit in the embodiment of FIG. 24.

The fifth embodiment of the invention will now be described with reference to FIG. 24. In FIG. 24, the like reference numerals as used in FIG. 1 designate the like elements as described in connection with FIG. 1. Designated as ES is an exhaust gas sensor which may be identical either with the exhaust gas sensor 2 shown in FIG. 4(a) or the sensor 208 shown in FIG. 13(b). Numeral 409 designates an auxiliary fuel passage opening into a main fuel passage 405 at the intermediate portion thereof, 410 a control valve for varying the cross-sectional area of the other opening of the auxiliary fuel passage which opens into a float chamber, 411 a cam mounted on the shaft of the pulse motor 6, 412 a link interconnecting the cam 411 and the control valve 410 as shown in detail in FIG. 25. Numeral 406 designates a reduction catalyst, 407 an oxidation catalyst. Numeral 414 designates a control circuit which controls the rotation of the pulse motor 6 in accordance with the output signal of the exhaust gas sensor ES (2 or 208) and which depending on the construction of the sensor ES may be identical in construction with those control circuits previously described in detail. The control circuit 414 rotates the pulse motor 6 in both forward and backward directions.

The operation of the fifth embodiment will be first described for the case where the exhaust gas sensor ES comprises the sensor 208 shown in FIG. 13(b). When the air-fuel mixture ratio is low so that an output voltage Y of the exhaust gas sensor 208 is high, the pulse motor 6 is rotated in a direction that displaces the control valve 410 downward and the cross-sectional area of the auxiliary fuel passage 409 is reduced to increase the air-fuel mixture ratio to attain the desired value. On the other hand, when the air-fuel mixture ratio is high, the output voltage Y of the exhaust gas sensor 208 is low so that the pulse motor 6 is rotated in a direction which is reverse of that of the previously described case. Consequently, the control valve 410 is raised to act in such a manner that the auxiliary fuel quantity is increased and the air-fuel ratio is decreased to attain the desired air-fuel ratio.

On the other hand, when the sensor ES comprises the exhaust gas sensor 2 shown in FIG. 4(a), the fifth embodiment operates as follows. When the air-fuel ratio of the mixture is lower than the preset value $X_L$, the exhaust gas sensor 2 produces an electromotive force greater than the preset voltage $V_L$, with the result that the motor 6 is rotated in a direction that displaces the control valve 410 downward and the cross-sectional area of the auxiliary fuel passage 409 is reduced to increase the air-fuel ratio. In this way, the air-fuel ratio is corrected to attain the desired air-fuel ratio. When the air-fuel ratio of the mixture is between the preset values $X_L$ and $X_U$, also the output of the exhaust gas sensor 2 is between the preset values $V_L$ and $V_U$ and thus the pulse motor 6 is not rotated. When the air-fuel ratio of the mixture is greater than $X_U$, the output of the exhaust gas sensor 2 is lower than $V_U$ so that the motor 6 is rotated in the reverse direction and the control valve 410 is moved upward in such a manner that the auxiliary fuel quantity is increased and the air-fuel ratio is reduced. In this way, the air-fuel mixture is corrected to attain the desired value.

While, in the fifth embodiment described above, the rotation of the pulse motor 6 is transmitted through the cam 411 and the link 412 to be control valve 410 to displace it, any of the arrangements shown in FIG. 26 may also be used. In FIG. 26(a), the rotation of the motor 6 causes a cam 419 to rotate to displace a seat member 420 and thereby to displace the control valve 410. A spring 421 is normally pressing the seat member 420 against the cam 419. In the construction of FIG. 26(b) the control valve 410 is provided with a rack so that the control valve 410 is displaced in accordance with the rotation of a pinion 422 mounted on the shaft of the pulse motor 6, while in the construction of FIG. 26(c) a shaft 423 of the motor 6 is provided with external threads and the upper portion of the control valve 410 is formed with internal threads whereby to displace the control valve 410 in accordance with the roration of the motor 6.

From the foregoing description, it will be appreciated that the fifth embodiment of the invention can, by virtue of the fact that an auxiliary fuel passage is provided to open into the intermediate portion of a main fuel passage installed in a carburetor of an engine, a control valve is provided in the auxiliary fuel passage to vary the cross-sectional area thereof and the control valve is actuated by a pulse motor controlled by the output signal of air-fuel ratio sensing means for detecting the concentration of oxygen in exhaust gases as a substitution for the air-fuel mixture ratio, always maintain the air-fuel ratio of the mixtures fed to the engine at the desired value. There is another advantage that where an exhaust gas cleaning catalyst is employed, an improved exhuast gas cleaning efficiency is ensured and the breaking and deterioration of the catalyst are prevented. Still another great advantage is that by virtue of the fact that the control valve is actuated by the pulse motor, a high torque is ensured by a simple and compact structure, the structure can be installed in the engine with ease, an improved response characteristic is ensured over that obtained when the control valve is actuated by the engine vacuum or a hydraulic system, the design of the setting is facilitated and there is no danger of deterioration with age, and the control is effected with a higher degree of accuracy as compared with a mechanical actuator such as a diaphragm and moreover the control is not affected by the operating conditions of the engine.

SIXTH EMBODIMENT

In FIG. 27, there is illustrated a sixth embodiment of the invention. In FIG. 27, the like reference numerals as used in FIG. 24 designate the like or equivalent elements. Numeral 509 designates an air bleed which opens into the intermediate portion of the main fuel passage 405 and which is capable of varying the fuel quantity, 410 a control valve for varying the cross-sectional area of the air bleed 509 to control the amount of the air fed into the main fuel passage 405 from the air bleed 509. The remaining elements are practically the same with those included in the embodiment of FIG. 24. The exhaust gas sensor ES may similarly be the same in construction with either the exhaust gas sensor 2 or 208. Similarly, the control circuit 414 accomplishes the required control in association with the exhaust gas sensor ES which may be either the sensor 2 or 208.

When the exhaust gas sensor 208 is used as ES, the sixth embodiment operates as follows. When the air-fuel ratio of the mixture fed to the engine from the carburetor body 4 is low so that the output voltage of the sensor 208 is high, the control circuit 414 operates the pulse motor 6 in a direction that displaces the control valve 410 upward and increases the amount of the air flow through the air bleed 509 to decrease the amount of the fuel delivered through the main fuel passage 405 and increase the air-fuel ratio. In this way, the air-fuel ratio is corrected to attain the desired value. On the other hand, when the air-fuel mixture ratio is high so that the output of the exhaust gas sensor 208 is low, the control circuit 414 operates the motor 6 in a direction that displaces the control valve 410 downward and decreases the rate of the air-flow from the air bleed 509 to increase the amount of the fuel delivered through the main fuel passage 405 and decrease the air-fuel ratio. In this way, the air-fuel mixture ratio is corrected to attain the desired value.

When the exhaust gas sensor 2 is used as ES, the operation of the sixth embodiment is as follows. In the event that the air-fuel ratio of the mixture is lower than the preset value $X_L$, the exhaust gas sensor 2 produces an electromotive force corresponding to the air-fuel ratio which is greater than the preset voltage $V_L$. Consequently, the control circuit 410 operates the motor 6 in a direction that displaces the control valve 410 upward and increases the amount of the air flow through the air bleed 509 to decrease the amount of the fuel delivered through the main fuel passage 405 and increase the air-fuel ratio. In this way, the air-fuel ratio is corrected to attain the desired value. When the air-fuel ratio of the mixture is intermediate the predetermined values $X_L$ and $X_U$, the output of the exhaust gas sensor 2 is also intermediate the preset voltages $V_L$ and $V_U$ and thus the motor 6 is not operated. On the other hand, when the air-fuel ratio of the mixture is greater than the preset value $X_U$ so that the output of the exhaust gas sensor 2 is lower than $V_U$, the motor 6 is operated in the reverse direction, with the result that the control valve 410 is displaced downward and the amount of the air flow through the air bleed 509 is decreased to increase the amount of the fuel delivered through the main fuel passage 405 and thereby to decrease the air-fuel ratio. In this way, the air-fuel ratio is corrected to attain the desired value.

While, in the sixth embodiment described above, the control valve 410 is displaced by transmitting the rotation of the motor 6 to it through the cam 411 and the link 412, it should be understood that the constructions shown in FIGS. 26(a), 26(b) and 26(c) may also be employed.

From the foregoing description, it will be appreciated that the system according to the sixth embodiment can, by virtue of its novel construction wherein a control valve which varies the cross-sectional area of an air bleed opened into the intermediate portion of a main fuel passage installed in a carburetor of an engine, is actuated by a pulse motor controlled in accordance with the output signal of air-fuel ratio sensing means for detecting the concentration of oxygen in exhaust gases which is substitutable for the air-fuel mixture ratio, maintain the air-fuel ratio of the mixtures fed to the engine at the desired value at all times. There is another great advantage that where an exhaust gas cleaning catalyst is employed, the exhaust gas cleaning efficiency is improved and the breaking and deterioration of the catalyst are prevented. Still another great advantage is that by virtue of the fact that the control valve is actuated by the pulse motor, a higher torque is provided by a compact and simple structure, the structure can be installed with ease and an improved response characteristic is ensured over that obtained when the control valve is actuated by the engine vacuum or a hydraulic system, the designing of the setting is facilitated and there is no dangere of deterioration with age, and the accuracy of control is improved over that obtained when a mechanical actuator such as a diaphragm is employed and moreover the control is not affected by the operating conditions of the engine.

SEVENTH EMBODIMENT

The seventh embodiment of the invention will now be described with reference to FIG. 28. In FIG. 28, numeral 610 designates a negative feedback type variable venturi carburetor, 620 an internal combustion engine, 630 an exhaust manifold, 406 an oxidation catalyst, 14 a muffler, ES an exhaust gas sensor which may either be the previously described exhaust gas sensor 2 shown in FIG. 4(a) or the exhaust gas sensor 208 shown in FIG. 14(b). Numeral 670 designates an electric control circuit whose circuit construction is dependent on the type of the exhaust gas sensor ES. In this embodiment described so far, the exhaust gas composition is detected so that the ratio of the air to the fuel in the mixture, i.e., the so-called air-fuel ratio is detected in terms of the exhaust oxygen concentration by the sensor ES. The output signal of the sensor ES is applied to the electric control circuit 670 which determines whether the air-fuel ratio detected by the sensor ES is at its correct value. When the air-fuel ratio is not correct, a signal is applied to the carburetor 610 whereby when the mixture is rich in fuel the supply of the fuel is reduced to correct the air-fuel ratio to its correct value, whereas when the mixture is weak in fuel, the fuel supply is increased to correct the air-fuel value to its proper value.

Figure 29A:
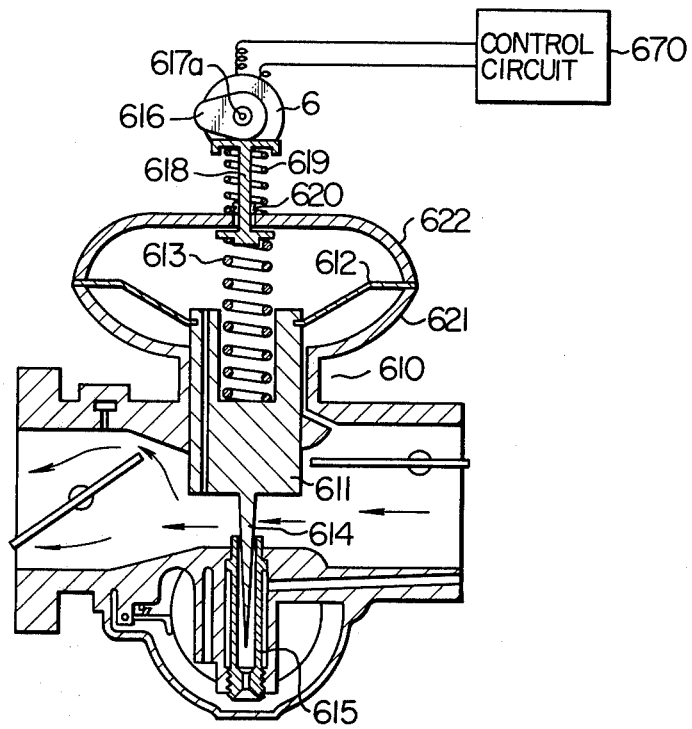
FIGS. 29(a) and 29(b) are sectional views useful for explaining the operation of an exemplary negative feedback type variable venturi carburetor in the embodiment of FIG. 28.
Figure 29B:
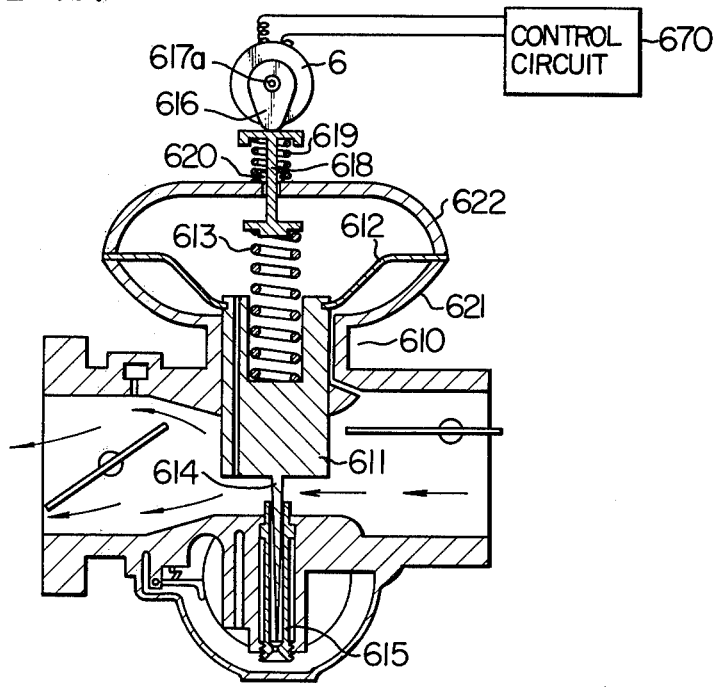

Next, the individual component elements shown in FIG. 28 will be described. Referring first to FIGS. 29(a) and 29(b) illustrating an exemplary form of the negative feedback type variable venturi carburetor 610 in this embodiment, numeral 611 designates a suction piston having a diaphragm 612 secured to the peripheral edge at one end thereof and a tapered jet needle 614 provided at the other end thereof. The outer peripheral edge of the diaphragm 612 is securely held between cases 621 and 622. Numeral 613 designates a piston spring whose one half is received within the suction piston 611 on the diaphragm 612 side to act on the piston 611 with a preset load.

Next, the air-fuel ratio control means for varying the cross-sectional area of the venturi in the carburetor 610 will be described with reference to FIGS. 29(a) and 29(b). Numeral 616 designates a cam, 6 a pulse motor having the cam 616 fixedly mounted on a driving shaft 617a thereof. Numeral 618 designates a shaft having one end thereof placed in contact with the cam 616 and the other end securely fastened to the upper end of the piston spring 613 to hold it in place. Numeral 619 designates a spring which acts to normally urge the upper end of the shaft 618 into contact with the cam 616, 620 a boot for preventing the air from entering into a vacuum chamber defined by the diaphragm 612 and the case 622.

The operation of the seventh embodiment will be first described for the case in which the exhaust gas sensor 208 shown in FIG. 13(b) is used as the sensor ES. When the electromotive force corresponding to the exhaust gas oxygen concentration detected by the sensor 208 is higher than a preset voltage, that is, when the air-fuel ratio is low or when the mixture fed to the engine is rich in fuel, the control circuit 670 rotates the pulse motor 6 in a clockwise direction in FIG. 29(a). Consequently, the preset load of the piston spring 613 is reduced and the cross-sectional area of the venturi throat is increased to decrease the speed of the air flow through the venturi throat. Consequently, the vacuum acting at the open end of a nozzle 615 is decreased and the rate of the fuel injected through the nozzle 615 is decreased to reduce the quantity of the fuel fed to the engine. In this way, the air-fuel ratio is corrected to approach the correct value. In this case, the pulse motor 6 is rotated in a digital manner like the second-hand of a watch.

On the other hand, when the output voltage of the sensor 208 is lower than the preset value, that is, when the air-fuel ratio is high or when the amount of the fuel fed to the engine 620 is small, the pulse motor 6 is rotated in the reverse direction so that the cam 616 compresses the piston spring 613 through the shaft 618 and the preset load of the spring 613 is increased, causing the piston 611 to move downward and decrease the cross-sectional area of the venturi throat. Consequently, the speed of the air flow through the venturi throat is increased and the vacuum acting at the open end of the nozzle 615 is increased, supplying more fuel to the engine 620 and causing the air-fuel ratio to approach the correct value.

When the exhaust gas sensor 2 shown in FIG. 4(a) is used as the sensor ES, the seventh embodiment operates as follows. As previously mentioned, the control circuit 670 operates differently from the case where the exhaust gas sensor 208 is used as the sensor ES. Let it be assumed that it is desired to operate the engine with the electromotive force of the sensor 2 being maintained at the desired value which is intermediate the preset voltages $V_L$ and $V_U$ corresponding to the preset air-fuel ratios $X_L$ and $X_U$.

When the electromotive force of the sensor 2 is higher than $V_L$, that is, the air-fuel ratio of the mixture is low or when the mixture fed to the engine 620 is rich in fuel, the pulse motor 6 is rotated in a clockwise direction so that the crosssectional area of the venturi throat is increased to reduce the speed of the air flow through it and the vacuum acting at the open end of the nozzle 615 is reduced. As a result, less fuel is allowed to flow through the nozzle 615 and the amount of the fuel fed to the engine 620 is decreased, causing the air-fuel mixture ratio to approach the correct value.

On the other hand, when the output voltage V of the sensor 2 is intermediate the preset voltages $V_L$ and $V_U$, the pulse motor 6 is maintained at rest.

Further, when the output voltage of the sensor 2 is lower than $V_U$, that is, when the air-fuel ratio of the mixture is high or when the amount of the fuel fed to the engine 620 is small, the pulse motor 6 is rotated in the reverse direction so that the preset load of the piston spring 613 increased to decrease the crosssectional area of the venturi throat. Consequently, the speed of the air flow through the venturi throat is increased to increase the vacuum acting at the open end of the nozzle 615 and the amount of the fuel injected through the nozzle 615 is increased to allow more fuel to be fed to the engine 620, thereby causing the air-fuel ratio to approach the correct value.

Figure 30A:
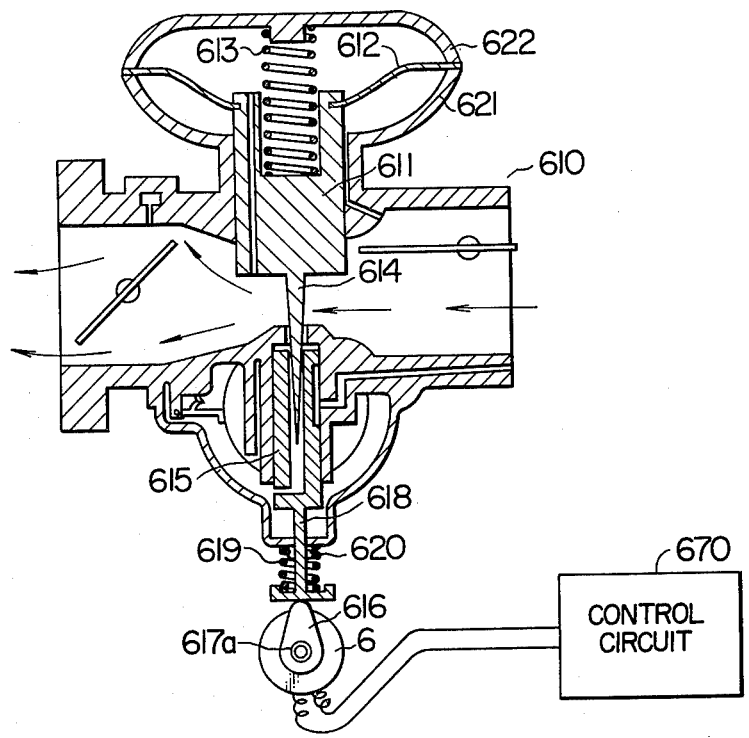
FIGS. 30(a) and 30(b) are sectional views useful for explaining the operation of another form of the negative feedback type variable venturi carburetor shown in FIGS. 29(a) and 29(b).
Figure 30B:
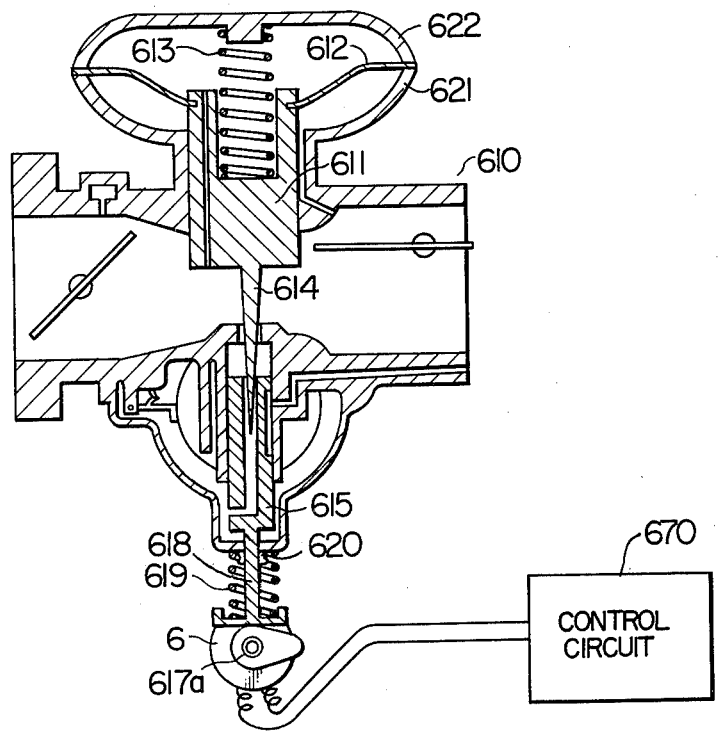

FIGS. 30(a) and 30(b) illustrate another form of the negative feedback type variable venturi carburetor. While, in the first form of the carburetor shown in FIGS. 29(a) and 29(b), the suction piston 611 is movable to vary the cross-sectional area of the venturi throat so that the speed of the air flow through it is varied to vary the amount of the fuel fed to the engine 620 to control the air-fuel mixture ratio at the correct value, in the second form of the carburetor the nozzle 615 is moved to vary the space between the needle 614 and the nozzle 615, i.e., the cross-sectional area of the fuel delivery opening to vary the amount of the fuel fed through the fuel delivery opening and thereby to control the air-fuel ratio of the mixtures. The detailed construction of the carburetor according to the second form is shown in FIGS. 30(a) and 30(b). A shaft 618 having a T-shaped lower end is integral with a nozzle 615, and a spring 619 is provided in such a manner that the surface of the shaft 618 which is not integrally connected to the nozzle 615 is normally brought into contact with a cam 616. A boot 620 is provided between the shaft 618 and the carburetor housing where they are in sliding contact with each other so as to prevent the fuel from leaking out of the carburetor.

Figure 31A:
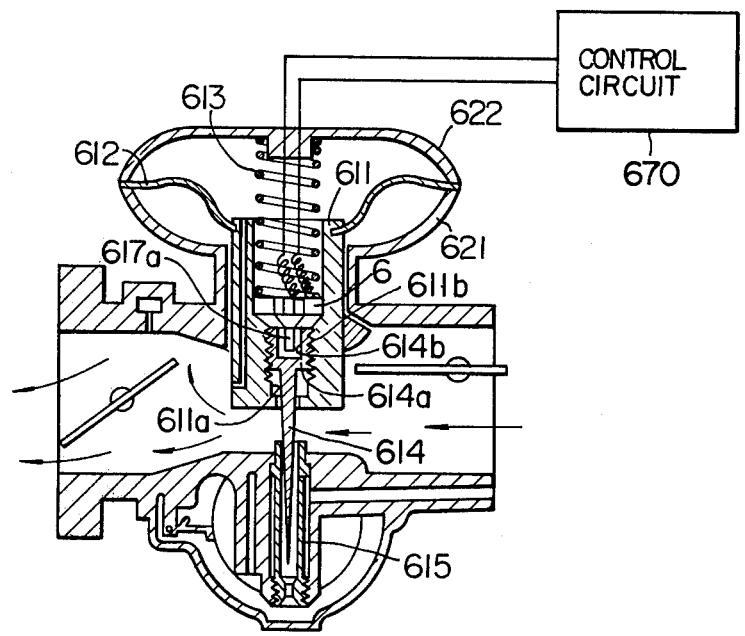
FIGS. 31(a) and 31(b) are sectional views useful for explaining the operation of still another form of the negative feedback type variable venturi carburetor shown in FIGS. 29(a) and 29(b).
Figure 31B:
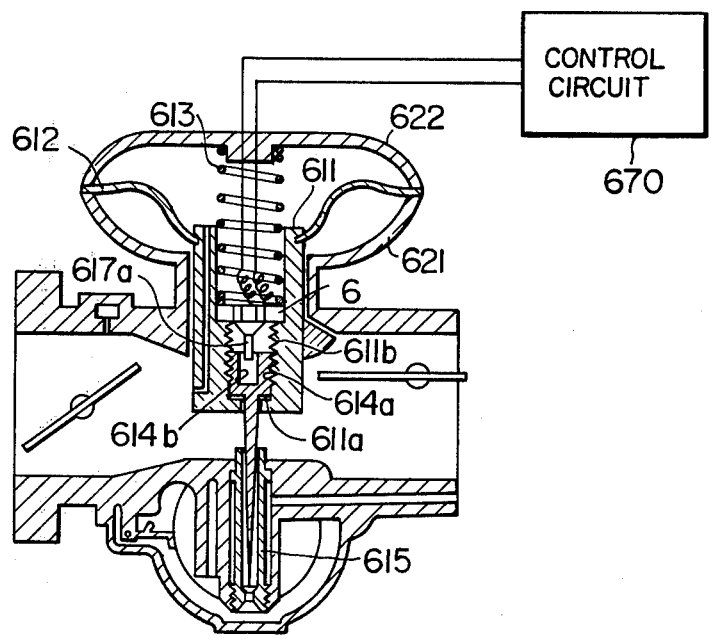

In the third form of the negative feedback type variable venturi carburetor shown in FIGS. 31(a) and 31(b), instead of being secured to a suction piston 611, a needle 614 is movable to vary the space between the needle 614 and the nozzle 615 or the cross-sectional area of the fuel emitting opening, so that the amount of the fuel delivered through the fuel emitting opening is varied to control the air-fuel ratio of the mixtures. In the construction of FIGS. 31(a) and 31(b), the needle 614 is formed on one end portion thereof with external threads 614a, and the suction piston 611 is provided with a slot 611a which is formed with internal threads 611b associated with the external threads 614a to threadedly connect the suction piston 611 and the needle 614 together. The needle 614 is also provided with a longitudinal slot 614b on the external threads 614a side thereof and a driving shaft 617a of a pulse motor 6 is fixedly mounted into the slot 614b, whereby the rotation of the pulse motor 6 turns the external threads 614a to move the needle 614 through the internal threads 611b and thereby to vary the cross-sectional area of the fuel emitting opening.

The carburetors according to the abovedescribed second and third forms perform the same function as the carburetor according to the first form. Further, it should be readily apparent to those skilled in the art that instead of connecting the nozzle 615 and the suction piston 611 to the pulse motor 6 with the connecting means comprising the cam 617 and the shaft 618, it is possible to use other structures similar to those which have been described in connection with FIGS. 26(b) and 26(c).

Further, the exhaust gas sensor ES may be comprised for example of an exhaust gas composition concentration sensor consisting of tin oxide for detecting the concentration of carbon monoxide in the exhaust gases and detecting the air-fuel ratio of the mixtures, and with such a sensor it is possible to perform the same function as the previously described exhaust gas sensors.

From the foregoing description, it will be appreciated that the system according to the seventh embodiment has a great advantage that by virtue of the fact that whether the air-fuel ratio of the mixtures is at its correct value is determined by the electric control circuit in accordance with the output voltage of the exhaust gas sensor for sensing the air-fuel ratio of the carburetor mixtures in accordance with the concentration of the exhaust gas composition, so that the output signal of the control circuit 670 is applied to the pulse motor 6 of the air-fuel ratio control means to control the cross-sectional area of the venturi throat and thereby to control the vacuum acting at the open end of the nozzle 615 and the needle 614 and the nozzle 615 are varied to control the cross-sectional area of the fuel emitting opening and thereby to control the air-fuel ratio of the mixture, the air-fuel ratio of the mixtures can always be maintained at the correct value even under those circumstances where it is otherwise difficult to perform the proper air-fuel ratio control due to a relatively inferior accuracy of finishing on the shape of the jet needle 614 or the assemblying of the nozzle 615 and the needle 614, the widening of the space between the nozzle 615 and the needle 614 caused by the wear thereof or the variations of the atmospheric temperature or pressure. Another great advantage is that since the air-fuel ratio of the mixtures can be maintained at the correct value at all times, any exhaust gas cleaning device such as a catalyst is permitted to perform the optimum cleaning action and thus it is possible to contribute toward the reduction of the air pollution.

Still another great advantage is that since the air-fuel ratio control means is actuated by the pulse motor, it is possible to provide a high torque with a compact and simple structure which can be installed with ease, an improved response characteristic is ensured over that obtained when the air-fuel ratio control means is actuated by the engine vacuum or a hydraulic system, the designing of the setting, etc. is facilitated and there is no danger of deterioration with age, and the accuracy of control is improved over that obtainable with the use of a mechanical actuator such as a diaphragm and moreover the control is not affected by the operating conditions of the engine. Even in the fifth, sixth and seventh embodiments it is possible to control the amount of auxiliary fuel at a rate corresponding to the operating conditions of the engine.

Without further analysis, the foregoing description of the specified embodiments will so fully reveal the gist of the present invention. However, the present invention is not intended to be limited to these embodiments and the scope of the invention is intended to be limited only by the following claims.

We claim:

1. An air-fuel ratio controlling system for an internal combustion engine comprising:
   a carburetor connected to an intake manifold of an internal combustion engine and including an intake passage for supplying an air-fuel mixture to said engine and a throttle valve disposed in said intake passage for controlling the amount of the air-fuel mixture;
   said carburetor also including;
      a suction piston slidably supported by said intake passage upstream of said throttle valve for forming a variable venturi therein, said suction piston being moved back and forth in accordance with the pressure difference between the pressure at the downstream location thereof and the pressure at the upstream location thereof;
      a fuel nozzle provided at said intake passage and opening at one end into said variable venturi for supplying fuel to said intake passage, the other end thereof being communicated with a float chamber storing fuel therein; and
   a needle valve coupled at one end to said suction piston, the other end thereof projecting into said fuel nozzle for controlling the amount of fuel to be supplied to said intake passage in response to an axial movement of said needle valve varied by at least said suction piston;
   driving means associated with said needle valve for varying the axial movement of the same irrespectively of the axial movement of said needle valve varied by said suction piston;
   air-fuel ratio sensing means disposed in an exhaust manifold of said engine for detecting the air-fuel ratio of the air-fuel mixture supplied to said engine; and
   a control circuit connected to said air-fuel ratio sensing means for controlling said driving means in accordance with the output from said air-fuel ratio sensing means to compensate the air-fuel ratio, whereby the fuel supplied from said fuel nozzle is increased when the air-fuel ratio detected by said air-fuel ratio sensing means is higher than a predetermined value, and being decreased when the air-fuel ratio is lower than said predetermined value to thereby control the air-fuel ratio of the air-fuel mixture to be supplied to said engine at a desired value.

2. An air-fuel ratio controlling system for an internal combustion engine comprising:

a carburetor connected to an intake manifold of an internal combustion engine and including an intake passage for supplying an air-fuel mixture to said engine and a throttle valve disposed in said intake passage for controlling the amount of the air-fuel mixture;

said carburetor also including;

a suction piston slidably supported by said intake passage upstream of said throttle valve for forming a variable venturi therein, said suction piston being moved back and forth in accordance with the pressure difference between the pressure at the downstream location and the pressure at the upstream location thereof;

a fuel nozzle slidably supported by said intake passage and opening at one end into said variable venturi for supplying fuel to said intake passage, the other end thereof being communicated with a float chamber storing fuel therein; and a needle valve coupled at one end to said suction piston the other end thereof projecting into said fuel nozzle, for controlling the amount of fuel to be supplied to said intake passage in response to an axial movement of said needle valve varied by said suction piston;

driving means coupled to said fuel nozzle for varying the axial movement of same with respect to said needle valve;

air-fuel ratio sensing means disposed in an exhaust manifold of said engine for detecting the air-fuel ratio of the air-fuel mixture supplied to said engine; and a control circuit connected to said air-fuel ratio sensing means for controlling said driving means in accordance with the output from said air-fuel ratio sensing means to compensate the air-fuel ratio, whereby the fuel supplied from said fuel nozzle is increased when the air-fuel ratio detected by said air-fuel ratio sensing means is higher than a predetermined value, and being decreased when the air-fuel ratio is lower than said predetermined value to thereby control the air-fuel ratio of the air-fuel mixture to be supplied to said engine at a desired value.

3. An air-fuel ratio controlling system for an internal combustion engine comprising:

a variable venturi carburetor including an intake passage for supplying an air-fuel mixture to an internal combustion engine, a suction piston slidably supported by said intake passage to form a variable venturi therein, a fuel nozzle opening at one end to said intake passage for supplying fuel to said intake passage, and a needle valve coupled at one end to said suction piston, the other end thereof projecting into said fuel nozzle;

a means for varying the relative distance between said fuel nozzle and said needle valve;

an air-fuel ratio sensing means disposed in an exhaust manifold of said engine for detecting the air-fuel ratio of the air-fuel mixture supplied to said engine; and a control means connected to said air-fuel ratio sensing means and said relative distance varying means for controlling said relative distance varying means in accordance with an output signal from said air-fuel ratio sensing means to compensate the air-fuel ratio of the mixture.

4. An air-fuel ratio controlling system for an internal combustion engine comprising:

a variable venturi carburetor including an intake passage for supplying an air-fuel mixture to an internal combustion engine, a suction piston slidably supported by said intake passage to form a variable venturi therein, a fuel nozzle opening at one end to said intake passage for supplying fuel to said intake passage, and a needle valve coupled at one end to said suction passage, the other end thereof projecting into said fuel nozzle;

a means for varying the relative distance between said fuel nozzle and said needle valve;

a pulse motor coupled to said varying means in order to control the relative distance between said fuel nozzle and said needle valve;

a pulse generator for generating a train of pulses having a frequency which varies in proportion to the rotational speed of said engine;

a frequency divider connected to said pulse generator for converting the train of pulses from said pulse generator into plural trains of pulses having different and lower frequencies;

detecting means for detecting a rapid change of the operational speed of said internal combustion engine;

selecting means connected to said detecting means for selecting one of said plural trains of pulses from said frequency divider in accordance with the detected change in the operational speed of said engine;

air-to-fuel ratio sensing means disposed in an exhaust manifold of said engine for detecting the air-to-fuel ratio of the air-fuel mixture supplied to said engine; and a control means connected to said selecting means, said air-to-fuel ratio sensing means and said pulse motor for driving said pulse motor at a speed determined by the selected train of pulses from said selecting means, the rotational direction of said pulse motor depending on the output of said air-to-fuel ratio sensing means.

5. The system according to claim 4 wherein said detecting means includes a drawn air quantity sensor for detecting the amount of the air drawn into said engine, and said control circuit being adapted to receive the output signal of said detecting means for operating said pulse motor at a speed corresponding to said detected change in said engine operating speed.

* * * * *